US010422935B2

(12) United States Patent
Yasui et al.

(10) Patent No.: US 10,422,935 B2
(45) Date of Patent: Sep. 24, 2019

(54) PRESSURE-SENSITIVE ADHESIVE LAYER ATTACHED POLARIZING FILM AND IMAGE DISPLAY

(71) Applicant: NITTO DENKO CORPORATION, Ibaraki-shi, Osaka (JP)

(72) Inventors: Atsushi Yasui, Ibaraki (JP); Yuusuke Toyama, Ibaraki (JP); Arata Fujihara, Ibaraki (JP); Tomoyuki Kimura, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 14/424,899

(22) PCT Filed: Aug. 27, 2013

(86) PCT No.: PCT/JP2013/072799
§ 371 (c)(1),
(2) Date: Feb. 27, 2015

(87) PCT Pub. No.: WO2014/034630
PCT Pub. Date: Mar. 6, 2014

(65) Prior Publication Data
US 2015/0293287 A1 Oct. 15, 2015

(30) Foreign Application Priority Data
Aug. 31, 2012 (JP) ................................. 2012-191786

(51) Int. Cl.
| G02B 5/30 | (2006.01) |
| G02B 1/14 | (2015.01) |
| C09J 133/06 | (2006.01) |
| C09J 133/14 | (2006.01) |
| C09J 7/38 | (2018.01) |
| C08K 5/34 | (2006.01) |
| C08K 5/43 | (2006.01) |
| G02F 1/1335 | (2006.01) |
| C08K 5/00 | (2006.01) |

(52) U.S. Cl.
CPC .............. *G02B 5/3033* (2013.01); *C08K 5/34* (2013.01); *C08K 5/43* (2013.01); *C09J 7/385* (2018.01); *C09J 133/06* (2013.01); *C09J 133/14* (2013.01); *G02B 1/14* (2015.01); *G02F 1/133528* (2013.01); *C08K 5/0075* (2013.01); *C09J 2201/606* (2013.01); *C09J 2203/318* (2013.01); *C09J 2205/102* (2013.01); *C09J 2433/00* (2013.01); *G02B 5/3025* (2013.01)

(58) Field of Classification Search
None
See application file for complete search history.

(56) References Cited

U.S. PATENT DOCUMENTS

| 6,451,156 | B2* | 9/2002 | Kishioka | ............ C08G 18/6254 156/329 |
| 7,070,051 | B2* | 7/2006 | Kanner | ............ A61B 17/06133 206/382 |
| 7,491,758 | B2* | 2/2009 | Amano | ............ C09J 7/0217 428/343 |
| 2001/0021452 | A1 | 9/2001 | Kishioka et al. | |
| 2006/0024494 | A1 | 2/2006 | Amano et al. | |
| 2006/0045990 | A1* | 3/2006 | Kim | ............ C09J 133/02 428/1.1 |
| 2006/0088670 | A1 | 4/2006 | Kim et al. | |
| 2009/0110849 | A1 | 4/2009 | Nishina | |
| 2009/0163626 | A1 | 6/2009 | Ukei et al. | |
| 2009/0317635 | A1* | 12/2009 | Amano | ............ C09J 7/0217 428/355 AC |
| 2010/0284072 | A1* | 11/2010 | Saitou | ............ C09J 7/0217 359/485.01 |

(Continued)

FOREIGN PATENT DOCUMENTS

| CN | 1727426 A | 2/2006 |
| CN | 101874091 A | 10/2010 |

(Continued)

OTHER PUBLICATIONS

International Search Report dated Oct. 1, 2013, issued in corresponding application No. PCT/JP2013/072799.
Notification of Transmittal of Translation of the International Preliminary Report on Patentability (Form PCT/IB/338) of International Application No. PCT/JP2013/072799 dated Mar. 12, 2015 with Forms PCT/IB/373 and PCT/ISA/237 (8 pages).
Office Action dated Oct. 12, 2016, issued in counterpart Taiwanese Patent Application No. 102131247, with English translation. (11 pages).
Office Action dated May 30, 2016, issued in counterpart Chinese Application No. 201380044704.2, with English translation (22 pages).

(Continued)

*Primary Examiner* — Frank D Ducheneaux
(74) *Attorney, Agent, or Firm* — Westerman, Hattori, Daniels & Adrian, LLP

(57) ABSTRACT

A pressure-sensitive adhesive layer attached polarizing film of invention includes a polarizing film; and a pressure-sensitive adhesive layer provided on the polarizing film, wherein the polarizing film comprises a polarizer and a transparent protective film provided on only one side of the polarizer, the pressure-sensitive adhesive layer is provided on a side of the polarizer opposite to the side on which the transparent protective film is provided, and the pressure-sensitive adhesive layer is made from a pressure-sensitive adhesive composition including a (meth)acryl-based polymer (A), an onium-anion salt (B1), and an alkali metal salt (B2). The pressure-sensitive adhesive layer attached polarizing film has a pressure-sensitive adhesive layer possessing an antistatic function and satisfactory durability even after a humidity test under severe conditions and is less prone to degradation of optical properties even after a humidity test under severe conditions.

19 Claims, No Drawings

(56) References Cited

U.S. PATENT DOCUMENTS

| | | |
|---|---|---|
| 2011/0245364 A1 | 10/2011 | Song et al. |
| 2011/0311810 A1* | 12/2011 | Yamagata ............... C09J 7/0207 428/354 |
| 2011/0315306 A1 | 12/2011 | Goto et al. |
| 2013/0160938 A1 | 6/2013 | Yasui et al. |
| 2014/0377550 A1* | 12/2014 | Yasui .................... C09J 7/0217 428/354 |

FOREIGN PATENT DOCUMENTS

| | | | |
|---|---|---|---|
| JP | 2003-246874 | A | 9/2003 |
| JP | 2005-307034 | A | 11/2005 |
| JP | 2006-63311 | A | 3/2006 |
| JP | 2007-302846 | A | 11/2007 |
| JP | 2008-506833 | A | 3/2008 |
| JP | 2009-251281 | A | 10/2009 |
| JP | 2010-44211 | A | 2/2010 |
| JP | 2010-150396 | A | 7/2010 |
| JP | 2010-159346 | A | 7/2010 |
| JP | 2010-523806 | A | 7/2010 |
| JP | 2010-202692 | A | 9/2010 |
| JP | 2011-16990 | A | 1/2011 |
| JP | 2011-100095 | A | 5/2011 |
| KR | 20060049137 | A | 5/2006 |
| KR | 20080044329 | A | 5/2008 |
| KR | 10-2011-0045011 | A | 5/2011 |
| TW | I241331 | B | 10/2005 |
| TW | 200613495 | A | 5/2006 |
| TW | 201107437 | A | 3/2011 |
| TW | 201111461 | A | 4/2011 |
| WO | 2007/034533 | A1 | 3/2007 |
| WO | 2008/128073 | A2 | 10/2008 |
| WO | 2009/066883 | A1 | 5/2009 |
| WO | 2010/100917 | A1 | 9/2010 |
| WO | 2012/029471 | A1 | 3/2012 |

OTHER PUBLICATIONS

Office Action dated May 10, 2016, issued in counterpart Japanese Application No. 2012-191786, with English translation (6 pages).
Office Action dated Feb. 20, 2017, issued in Taiwanese Patent Application No. 102131247 with English translation (13 pages).
Office Action dated Dec. 7, 2016, issued in Japanese Patent Application No. 2012-191786 with English machine translation (6 pages).
Report of Reconsideration by Examiner before Appeal dated May 12, 2017, issued in Japanese Patent Application No. 2012-191786, with English machine translation.
Office Action dated Mar. 22, 2018, issued in Japanese Patent Application No. 2012-191786, with translation.
Decision of Rejection issued in corresponding Taiwanese Patent Application No. 102131247 dated Oct. 19, 2017, with translation.
Office Action dated Mar. 1, 2018, issued in Japanese Patent Application No. 2012-191786, with translation.
Office Action dated Oct. 12, 2018, issued in counterpart to Japanese Application No. 2012-191786, with English translation (36 pages).
Office Action dated Jan. 21, 2019, issued in counterpart KR Application No. 10-2014-7033233, with English translation (9 pages).
Office Action dated Mar. 14, 2019, issued in counterpart JP Application No. 2018-094500, with English machine translation. (6 pages).

* cited by examiner

PRESSURE-SENSITIVE ADHESIVE LAYER ATTACHED POLARIZING FILM AND IMAGE DISPLAY

TECHNICAL FIELD

The invention relates to a pressure-sensitive adhesive layer attached polarizing film including a polarizing film and a pressure-sensitive adhesive layer provided on the polarizing film. The invention also relates to an image display such as a liquid crystal display device, an organic electroluminescent (EL) display device, or a plasma display panel (PDP) produced with the pressure-sensitive adhesive layer attached polarizing film.

BACKGROUND ART

The image-forming system of liquid crystal displays or the like requires polarizing elements to be placed on both sides of a liquid crystal cell, and generally polarizing films are bonded thereto. A pressure-sensitive adhesive is commonly used to bond such polarizing films to a liquid crystal cell. When such polarizing films are bonded to a liquid crystal cell, a pressure-sensitive adhesive is generally used to bond the materials together so that optical loss can be reduced. In such a case, the pressure-sensitive adhesive is provided in advance as a pressure-sensitive adhesive layer on one side of a polarizing film, and the resulting pressure-sensitive adhesive layer attached polarizing film is generally used because it has some advantages such as no need for a drying process to fix the polarizing film. A release film is generally provided to the pressure-sensitive adhesive layer of the pressure-sensitive adhesive layer attached polarizing film.

During the manufacture of a liquid crystal display, the pressure-sensitive adhesive layer-attached polarizing film is bonded to a liquid crystal cell. In this process, static electricity is generated when the release film is peeled off from the pressure-sensitive adhesive layer of the pressure-sensitive adhesive layer-attached polarizing film. The static electricity generated in this manner may affect the orientation of the liquid crystal in the liquid crystal display to cause a failure. The static electricity may also cause display unevenness when the liquid crystal display operates. For example, the static generation can be suppressed when an antistatic layer is formed on the outer surface of the polarizing film, but its effect is not high, and there is a problem in which static generation cannot be fundamentally prevented. To suppress static generation in a fundamental position, therefore, the pressure-sensitive adhesive layer is required to have an antistatic function. Concerning means for providing an antistatic function to a pressure-sensitive adhesive layer, for example, it is proposed that an ionic compound should be added to a pressure-sensitive adhesive used to form a pressure-sensitive adhesive layer (Patent Documents 1 and 2). Patent Document 1 discloses that an ionic solid including an imidazolium cation and an inorganic anion is added to an acrylic pressure-sensitive adhesive for use on polarizing films. Patent Document 2 discloses that an organic molten salt, such as an onium salt, which is in a liquid state at room temperature and includes a quaternary nitrogen atom-containing cation of 6 to 50 carbon atoms and a fluorine atom-containing anion, is added to an acrylic pressure-sensitive adhesive for use on polarizing films. There is also proposed a method in which a conductive polymer such as polythiophene is used as a binder to form an antistatic layer between a polarizing film and a pressure-sensitive adhesive layer (Patent Document 3). The pressure-sensitive adhesive layer attached polarizing film bonded to an object also needs to be durable.

PRIOR ART DOCUMENTS

Patent Documents

Patent Document 1: JP-A-2009-251281
Patent Document 2: WO 2007/034533 A
Patent Document 3: JP-A-2003-246874

SUMMARY OF THE INVENTION

Problems to Be Solved by the Invention

Patent Documents 1 and 2 disclose that a pressure-sensitive adhesive layer made from a pressure-sensitive adhesive composition containing an ionic compound is applied to a polarizing film when an antistatic function is provided. The polarizing films disclosed in Patent Documents 1 and 2 all have protective members such as transparent protective films provided on both sides of a polarizer.

On the other hand, there are some applications using a pressure-sensitive adhesive layer attached polarizing film including a polarizer, a transparent protective film provided on only one side of the polarizer, and a pressure-sensitive adhesive layer provided on the other side of the polarizer with no transparent protective film. This pressure-sensitive adhesive layer attached polarizing film, which has a transparent protective film only on one side, can be cheaper than that having transparent protective films on both sides, because the cost of a layer of transparent protective film can be saved. In this case, however, when an ionic compound is added to the pressure-sensitive adhesive layer to provide an antistatic function, the ionic compound in the pressure-sensitive adhesive layer can significantly affect the polarizer. In this case, for example, there is a problem in that an ionic liquid or solid used as the ionic compound can degrade the polarizer so that the optical properties can significantly degrade after a humidity test.

A layer containing a conductive polymer such as polythiophene provided between a polarizing film and a pressure-sensitive adhesive layer as disclosed in Patent Document 3 can also degrade the polarizer and the optical properties.

It is an object of the invention to provide a pressure-sensitive adhesive layer attached polarizing film that has a pressure-sensitive adhesive layer possessing an antistatic function and satisfactory durability even after a humidity test under severe conditions and is less prone to degradation of optical properties even after a humidity test under severe conditions.

It is another object of the invention to provide an image display produced with such a pressure-sensitive adhesive layer attached polarizing film.

Means to Solve the Problems

As a result of investigations for solving the problems, the inventors have found the pressure-sensitive adhesive layer attached polarizing film described below and have completed the invention.

The invention relates to a pressure-sensitive adhesive layer attached polarizing film, including:

a polarizing film; and a pressure-sensitive adhesive layer provided on the polarizing film, wherein the polarizing film includes a polarizer and a transparent protective film provided on only one side of the polarizer, the pressure-sensitive adhesive layer is provided on a side of the polarizer opposite to the side on which the transparent protective film is provided, and the pressure-sensitive adhesive layer is made from a pressure-sensitive adhesive composition including a (meth) acryl-based polymer (A), an onium-anion salt (B1), and an alkali metal salt (B2).

In the pressure-sensitive adhesive layer attached polarizing film, the onium-anion salt (B1) is preferably an onium-fluorine-containing imide anion salt.

In the pressure-sensitive adhesive layer attached polarizing film, the onium of the onium-anion salt (B1) is preferably at least one selected from a nitrogen-containing onium, a sulfur-containing onium, and a phosphorus-containing onium.

In the pressure-sensitive adhesive layer attached polarizing film, the onium of the onium-anion salt (B1) is preferably at least one selected from ammonium, pyrrolidinium, piperidinium, and sulfonium. The onium of the onium-anion salt (B1) is preferably pyrrolidinium.

In the pressure-sensitive adhesive layer attached polarizing film, the onium of the onium-anion salt (B1) preferably has no unsaturated bond.

In the pressure-sensitive adhesive layer attached polarizing film, the onium of the onium-anion salt (B1) is preferably an alkyl onium having an alkyl group of 1 to 4 carbon atoms.

In the pressure-sensitive adhesive layer attached polarizing film, it is preferable to contain 0.1 to 10 parts by weight of the onium-anion salt (B1) based on 100 parts by weight of the (meth)acryl-based polymer (A).

In the pressure-sensitive adhesive layer attached polarizing film, the alkali metal of the alkali metal salt (B2) is preferably lithium.

In the pressure-sensitive adhesive layer attached polarizing film, it is preferable to contain 0.01 to 5 parts by weight of the alkali metal salt (B2) based on 100 parts by weight of the (meth)acryl-based polymer (A).

In the pressure-sensitive adhesive layer attached polarizing film, the polarizer may have a thickness of 10 µm or less.

In the pressure-sensitive adhesive layer attached polarizing film, it is preferable to use the (meth)acryl-based polymer (A) including an alkyl (meth)acrylate monomer unit and a hydroxyl group-containing monomer unit.

In the pressure-sensitive adhesive layer attached polarizing film, it is preferable to use the (meth)acryl-based polymer (A) including an alkyl (meth)acrylate monomer unit and a carboxyl group-containing monomer unit.

In the pressure-sensitive adhesive layer attached polarizing film, the pressure-sensitive adhesive composition further may include a crosslinking agent (C). In the pressure-sensitive adhesive composition, it is preferable to contain 0.01 to 20 parts by weight of the crosslinking agent (C) based on 100 parts by weight of the (meth)acryl-based polymer (A). The crosslinking agent (C) is preferably at least one selected from an isocyanate compound and a peroxide.

In the pressure-sensitive adhesive layer attached polarizing film, it is possible to further include 0.001 to 5 parts by weight of a silane coupling agent (D) based on 100 parts by weight of the (meth)acryl-based polymer (A).

In the pressure-sensitive adhesive layer attached polarizing film, it is possible to further include 0.001 to 10 parts by weight of a polyether-modified silicone compound based on 100 parts by weight of the (meth)acryl-based polymer (A).

In the pressure-sensitive adhesive layer attached polarizing film, the (meth)acryl-based polymer (A) preferably has a weight average molecular weight of 500,000 to 3,000,000.

The invention also relates to an image display, including at least one piece of the pressure-sensitive adhesive layer-attached optical film.

Effect of the Invention

If an ionic compound is added to a pressure-sensitive adhesive produced using an acryl-based polymer as a base polymer, an antistatic function can be provided to the pressure-sensitive adhesive. It is considered that in this case, the ionic compound can bleed out to the surface of the pressure-sensitive adhesive layer, so that the antistatic function can be efficiently produced. On the other hand, an ionic compound in contact with a polarizer can degrade optical properties of the polarizer such as the degree of polarization.

The pressure-sensitive adhesive composition used to form the pressure-sensitive adhesive layer for the pressure-sensitive adhesive layer attached polarizing film of the invention contains the onium-anion salt (B1) and the alkali metal salt (B2) as ionic compounds capable of providing an antistatic function in addition to the (meth)acryl-based polymer (A) as the base polymer.

It has been found that when the onium-anion salt (B1) and the alkali metal salt (B2) are used together as ionic compounds according to the invention, polarizer degradation can be suppressed while the antistatic function and durability are maintained even after a humidity test under severe conditions. Particularly when the onium-anion salt (B1) is an onium-fluorine-containing imide anion salt, polarizer degradation is effectively suppressed.

Mode for Carrying Out the Invention

The pressure-sensitive adhesive composition used to form the pressure-sensitive adhesive layer for the pressure-sensitive adhesive layer attached polarizing film of the invention contains a (meth)acryl-based polymer (A) as a base polymer. The (meth)acryl-based polymer (A) includes an alkyl (meth) acrylate monomer unit as a main component. The term "(meth)acrylate" refers to acrylate and/or methacrylate, and "(meth)" is used in the same meaning in the description.

The alkyl (meth)acrylate used to form the main skeleton of the (meth)acrylic polymer (A) may have a straight- or branched-chain alkyl group of 1 to 18 carbon atoms. Examples of such an alkyl group include methyl, ethyl, propyl, isopropyl, butyl, isobutyl, amyl, hexyl, cyclohexyl, heptyl, 2-ethylhexyl, isooctyl, nonyl, decyl, isodecyl, dodecyl, isomyristyl, lauryl, tridecyl, pentadecyl, hexadecyl, heptadecyl, and octadecyl groups. These may be used singly or in any combination. The average number of carbon atoms in the alkyl group is preferably from 3 to 9.

In order to improve tackiness or heat resistance, one or more copolymerizable monomers having an unsaturated double bond-containing polymerizable functional group such as a (meth)acryloyl group or a vinyl group may be introduced into the (meth)acryl-based polymer (A) by copolymerization. Examples of such copolymerizable monomers include hydroxyl group-containing monomers such as 2-hydroxyethyl (meth)acrylate, 3-hydroxypropyl (meth)acrylate, 4-hydroxybutyl (meth)acrylate, 6-hydroxyhexyl (meth)

acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; carboxyl group-containing monomers such as (meth)acrylic acid, carboxyethyl (meth)acrylate, carboxypentyl (meth)acrylate, itaconic acid, maleic acid, fumaric acid, and crotonic acid; acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate.

Examples of such a monomer for modification also include (N-substituted) amide monomers such as (meth)acrylamide, N,N-dimethyl(meth)acrylamide, N-butyl(meth)acrylamide, N-methylol(meth)acrylamide, and N-methylolpropane(meth)acrylamide; alkylaminoalkyl (meth)acrylate monomers such as aminoethyl (meth)acrylate, N,N-dimethylaminoethyl (meth)acrylate, and tert-butylaminoethyl (meth)acrylate; alkoxyalkyl (meth)acrylate monomers such as methoxyethyl (meth)acrylate and ethoxyethyl (meth)acrylate; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine; maleimide monomers such as N-cyclohexylmaleimide, N-isopropylmaleimide, N-laurylmaleimide, and N-phenylmaleimide; and itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide.

Examples of modification monomers that may also be used include vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl (meth)acrylate; glycol acrylic ester monomers such as polyethylene glycol (meth)acrylate, polypropylene glycol (meth)acrylate, methoxyethylene glycol (meth)acrylate, and methoxypolypropylene glycol (meth)acrylate; and acrylate ester monomers such as tetrahydrofurfuryl (meth)acrylate, fluoro(meth)acrylate, silicone (meth)acrylate, and 2-methoxyethyl acrylate. Examples also include isoprene, butadiene, isobutylene, and vinyl ether.

Besides the above, a silicon atom-containing silane monomer may be exemplified as the copolymerizable monomer. Examples of the silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

Copolymerizable monomers that may be used also include polyfunctional monomers having two or more unsaturated double bonds such as (meth)acryloyl groups or vinyl groups, which include (meth)acrylate esters of polyhydric alcohols, such as tripropylene glycol di(meth)acrylate, tetraethylene glycol di(meth)acrylate, 1,6-hexanediol di(meth)acrylate, bisphenol A diglycidyl ether di(meth)acrylate, neopentyl glycol di(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, and caprolactone-modified dipentaerythritol hexa(meth)acrylate; and compounds having a polyester, epoxy or urethane skeleton to which two or more unsaturated double bonds are added in the form of functional groups such as (meth)acryloyl groups or vinyl groups in the same manner as the monomer component, such as polyester (meth)acrylates, epoxy (meth)acrylates and urethane (meth)acrylates.

Concerning the weight ratios of all monomer components, the alkyl (meth)acrylate should be a main component of the (meth)acryl-based polymer (A), and the amount of the copolymerizable monomer used to form the (meth)acryl-based polymer (A) is preferably, but not limited to, 0 to about 20%, more preferably about 0.1 to about 15%, even more preferably about 0.1 to about 10%, based on the total weight of all monomer components.

Among these copolymerizable monomers, hydroxyl group-containing monomers or carboxyl group-containing monomers are preferably used in view of tackiness or durability. The hydroxyl group-containing monomer may be used in combination with the carboxyl group-containing monomer. When the pressure-sensitive adhesive composition contains a crosslinking agent, these copolymerizable monomers can serve as a reactive site with the crosslinking agent. Such hydroxyl group-containing monomers or carboxyl group-containing monomers are highly reactive with intermolecular crosslinking agents and therefore are preferably used to improve the cohesiveness or heat resistance of the resulting pressure-sensitive adhesive layer. Hydroxyl group-containing monomers are preferred in terms of reworkability, and carboxyl group-containing monomers are preferred in terms of achieving both durability and reworkability.

When a hydroxyl group-containing monomer is added as a copolymerizable monomer, its content is preferably from 0.01 to 15% by weight, more preferably from 0.03 to 10% by weight, even more preferably from 0.05 to 7% by weight. When a carboxyl group-containing monomer is added as a copolymerizable monomer, its content is preferably from 0.05 to 10% by weight, more preferably from 0.1 to 8% by weight, even more preferably from 0.2 to 6% by weight.

In an embodiment of the invention, the (meth)acryl-based polymer (A) used generally has a weight average molecular weight in the range of 500,000 to 3,000,000. In view of durability, particularly in view of heat resistance, the weight average molecular weight of the polymer (A) used is preferably from 700,000 to 2,700,000, more preferably from 800,000 to 2,500,000. If the weight average molecular weight is less than 500,000, it is not preferred in view of heat resistance. If a weight average molecular weight is more than 3,000,000, it is not preferred because a large amount of a dilution solvent may be necessary for control of coating viscosity, which may increase cost. The weight average molecular weight refers to the value obtained by measurement by gel permeation chromatography (GPC) and conversion of the measured value into the polystyrene-equivalent value.

For the production of the (meth)acrylic polymer (A), any appropriate method may be selected from known production methods such as solution polymerization, bulk polymerization, emulsion polymerization, and various radical polymerization methods. The resulting (meth)acrylic polymer (A)

may be any type of copolymer such as a random copolymer, a block copolymer and a graft copolymer.

In a solution polymerization process, for example, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acrylic polymer (A) may be controlled by the reaction conditions including the amount of addition of the polymerization initiator or the chain transfer agent and monomers concentration. The amount of the addition may be controlled as appropriate depending on the type of these materials.

Examples of the polymerization initiator include, but are not limited to, azo initiators such as 2,2'-azobisisobutyronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl) peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total amount of the polymerization initiator is preferably from about 0.005 to 1 part by weight, more preferably from about 0.02 to about 0.5 parts by weight, based on 100 parts by weight of the monomer.

For example, when 2,2'-azobisisobutyronitrile is used as a polymerization initiator for the production of the (meth)acrylic polymer with the above weight average molecular weight, the polymerization initiator is preferably used in an amount of from about 0.06 to 0.2 parts by weight, more preferably of from about 0.08 to 0.175 parts by weight, based on 100 parts by weight of the total amount of the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. One of these chain transfer agents may be used alone, or two or more thereof may be used in a mixture. The total amount of the chain transfer agent is preferably 0.1 parts by weight or less, based on 100 parts by weight of the total amount of the monomer components.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group such as a propenyl group and an allyl ether group include Aqualon HS-10, HS-20, KH-10, BC-05, BC-10, and BC-20 (each manufactured by Dai-ichi Kogyo Seiyaku Co., Ltd.) and Adekaria Soap SE10N (manufactured by Asahi Denka Kogyo K.K.). The reactive emulsifier is preferred, because after polymerization, it can be incorporated into a polymer chain to improve water resistance. Based on 100 parts by weight of the total monomer component, the emulsifier is preferably used in an amount of 0.3 to 5 parts by weight, more preferably of 0.5 to 1 parts by weight, in view of polymerization stability or mechanical stability.

The pressure-sensitive adhesive composition according to the invention contains the onium-anion salt (B1) and the alkali metal salt (B2) in addition to the (meth)acryl-based polymer (A).

[Onium-Anion Salt (B1)]

The onium-anion salt (B1) is an "ionic compound," which is also called an ionic liquid or solid. The onium-anion salt (B1) is a cation-anion salt, which includes a cationic component and an anionic component. A cation-anion salt including an onium cation, namely, an onium-anion salt is used in the invention.

<Anionic Component>

Examples of the anionic component that may be used include $Cl^-$, $Br^-$, $I^-$, $Al_2Cl_4^-$, $Al_2Cl_7^-$, $BF_4^-$, $PF_6^-$, $ClO_4^-$, $NO_3^-$, $CH_3COO-$, $CF_3COO^-$, $CH_3SO_3^-$, $CF_3SO_3^-$, $(CF_3SO_2)_3C^-$, $AsF_6^-$, $SbF_6^-$, $NbF_6^-$, $TaF_6^-$, $(CN)_2N^-$, $C_4F_9SO_3^-$, $C_3F_7COO^-$, $(CF_3SO_2)(CF_3CO)N^-$, and $^-O_3S(CF_2)_3SO_3^-$, and those represented by the following general formulae (1) to (4):

$$(C_nF_{2n+1}SO_2)_2N^-, \quad (1)$$

wherein n is an integer of 1 to 10;

$$CF_2(C_mF_{2m}SO_2)_2N^-, \quad (2)$$

wherein m is an integer of 1 to 10;

$$^-O_3S(CF_2)_lSO_3^-, \quad (3)$$

wherein l is an integer of 1 to 10; and $$(C_pF_{2p+1}SO_2)N^-(C_qF_{2q+1}SO_2), \quad (4)$$

wherein p and q are each an integer of 1 to 10. In particular, a fluorine atom-containing anionic component is preferably used because it can form an ionic compound with good ionic dissociation properties. Especially, the anionic component is preferably fluorine-containing imide anion.

<<Fluorine-Containing Imide Anion>>

The fluorine-containing imide anion may be, for example, a perfluoroalkyl group-containing imide anion.

Examples of the fluorine-containing imide anion that may be used include some of the anionic components listed above, such as $(CF_3SO_2)(CF_3CO)N^-$ and those represented by the following general formulae (1), (2) and (4):

$$(C_nF_{2n+1}SO_2)_2N^-, \quad (1)$$

wherein n is an integer of 1 to 10;

$$CF_2(C_mF_{2m}SO_2)_2N^-, \quad (2)$$

wherein m is an integer of 1 to 10; and $$(C_pF_{2p+1}SO_2)N^-(C_qF_{2q+1}SO_2), \quad (4)$$

wherein p and q are each an integer of 1 to 10. These fluorine-containing imide anions are preferably used because they can form ionic compounds with good ionic dissociation properties. The fluorine-containing imide anion preferably has a fluoroalkyl or fluoroalkylene group of 1 to 4 carbon atoms so that the surface resistance can be controlled to be small and static electricity-induced unevenness can be suppressed. The fluorine-containing imide anion is preferably a (perfluoroalkylsulfonyl)imide anion represented by formula (1), such as $(CF_3SO_2)_2N^-$ or $(C_2F_5SO_2)_2N^-$, more preferably a (trifluoromethanesulfonyl)imide anion represented by $(CF_3SO_2)_2N^-$.

<Onium>

In the onium-anion salt (B1), the onium forms a cationic part, and a protonated atom forms the onium ion. In order to suppress polarizer degradation, the onium according to the invention preferably does not have an unsaturated bond such as a double or triple bond to form the onium salt. Specifically, in the invention, the onium is preferably an organic onium, which has an organic group or the like as a substituent forming the onium ion.

The organic group in the organic onium may be, for example, alkyl, alkoxyl, alkenyl, or the like. Among them, an unsaturated bond-free group is preferred for suppression of polarizer degradation. The number of carbon atoms in the alkyl group is typically selected from 1 to 12, preferably from 1 to 8, more preferably from 1 to 4. The organic onium is preferably an alkyl onium having alkyl groups of 1 to 4 carbon atoms as all the substituents. The alkyl group may be a linear or branched chain, preferably a linear chain. The organic onium may also have a cyclic structure. In this case, the onium preferably has a five- or six-membered ring and an alkyl group or groups of 1 to 4 carbon atoms as other substituents.

The onium may be, but not limited to, a nitrogen-containing onium, a sulfur-containing onium, or a phosphorus-containing onium. Among them, a nitrogen-containing onium and a sulfur-containing onium are preferred.

The nitrogen-containing onium may be an ammonium cation, a piperidinium cation, a pyrrolidinium cation, a pyridinium cation, a pyrroline skeleton-containing cation, a pyrrole skeleton-containing cation, an imidazolium cation, a tetrahydropyrimidinium cation, a dihydropyrimidinium cation, a pyrazolium cation, or a pyrazolinium cation. Among them, an ammonium cation, a piperidinium cation, and a pyrrolidinium cation are preferred, and pyrrolidinium is more preferred, in view of polarizer degradation. Specifically, the nitrogen-containing onium is preferably a tetraalkylammonium cation, an alkylpiperidinium cation, or an alkylpyrrolidinium cation.

The sulfur-containing onium may be a sulfonium cation or the like. The phosphorus-containing onium may be a phosphonium cation or the like.

Any compound composed of a combination of any of the above onium components and any of the above anionic components may be appropriately selected and used as the onium-anion salt (B1). In the invention, the anion of the onium-anion salt (B1) is preferably a fluorine-containing imide anion, and thus the salt (B1) is preferably an onium-fluorine-containing imide anion salt.

For example, any compound composed of a combination of any of the above onium components and any fluorine-containing imide anion component may be appropriately selected and used as the onium-fluorine-containing imide anion salt. At least one selected from a nitrogen-containing onium salt, a sulfur-containing onium salt, and a phosphorus-containing onium salt is preferably used as the onium-fluorine-containing imide anion salt. More preferably, at least one selected from an ammonium salt, a pyrrolidinium salt, a piperidinium salt, and a sulfonium salt is used as the onium-fluorine-containing imide anion salt.

Examples of the onium-fluorine-containing imide anion salt include 1-butyl-3-methylpyridinium bis(trifluoromethanesulfonyl)imide, 1-butyl-3-methylpyridinium bis(pentafluoroethanesulfonyl)imide, 1-ethyl-3-methylimidazolium bis(trifluoromethanesulfonyl)imide, 1-ethyl-3-methylimidazolium bis(pentafluoroethanesulfonyl)imide, 1-butyl-3-methylimidazolium bis(trifluoromethanesulfonyl)imide, 1,2-dimethyl-3-propylimidazolium bis(trifluoromethanesulfonyl)imide, tetrahexylammonium bis(trifluoromethanesulfonyl)imide, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammonium bis(trifluoromethanesulfonyl)imide, N,N-diethyl-N-methyl-N-(2-methoxyethyl)ammonium bis(pentafluoroethanesulfonyl)imide, glycidyltrimethylammonium bis(trifluoromethanesulfonyl)imide, glycidyltrimethylammonium bis(pentafluoroethanesulfonyl)imide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, and N-methyl-N-ethyl-N-propyl-N-pentylammonium bis(trifluoromethanesulfonyl)imide. Commercially available products of the above may be used, examples of which include CIL-314 manufactured by Japan Carlit Co., Ltd. and ILA2-1 manufactured by KOEI CHEMICAL COMPANY LIMITED.

Examples thereof also include tetramethylammonium bis(trifluoromethanesulfonyl)imide, trimethylethylammonium bis(trifluoromethanesulfonyl)imide, trimethylbutylammonium bis(trifluoromethanesulfonyl)imide, trimethylpentylammonium bis(trifluoromethanesulfonyl)imide, trimethylheptylammonium bis(trifluoromethanesulfonyl)imide, trimethyloctylammonium bis(trifluoromethanesulfonyl)imide, tetraethylammonium bis(trifluoromethanesulfonyl)imide, triethylbutylammonium bis(trifluoromethanesulfonyl)imide, tetrabutylammonium bis(trifluoromethanesulfonyl)imide, and tetrahexylammonium bis(trifluoromethanesulfonyl)imide.

Examples thereof further include 1-dimethylpyrrolidinium bis(trifluoromethanesulfonyl)imide, 1-methyl-1-ethylpyrrolidinium bis(trifluoromethanesulfonyl)imide, 1-methyl-1-propylpyrrolidinium bis(trifluoromethanesulfonyl)imide, 1-methyl-1-butylpyrrolidinium bis(trifluoromethanesulfonyl)imide, 1-methyl-1-pentylpyrrolidinium bis(trifluoromethanesulfonyl)imide, 1-methyl-1-hexylpyrrolidinium bis(trifluoromethanesulfonyl)imide, 1-methyl-1-heptylpyrrolidinium bis(trifluoromethanesulfonyl)imide, 1-ethyl-1-propylpyrrolidinium bis(trifluoromethanesulfonyl)imide, 1-ethyl-1-butylpyrrolidinium bis(trifluoromethanesulfonyl)imide, 1-ethyl-1-pentylpyrrolidinium bis(trifluoromethanesulfonyl)imide, 1-ethyl-1-hexylpyrrolidinium bis(trifluoromethanesulfonyl)imide, 1-ethyl-1-heptylpyrrolidinium bis(trifluoromethanesulfonyl)imide, 1,1-dipropylpyrrolidinium bis(trifluoromethanesulfonyl)imide, 1-propyl-1-butylpyrrolidinium bis(trifluoromethanesulfonyl)imide, 1,1-dibutylpyrrolidinium bis(trifluoromethanesulfonyl)imide, 1-propylpiperidinium bis(trifluoromethanesulfonyl)imide, 1-pentylpiperidinium bis(trifluoromethanesulfonyl)imide, 1,1-dimethylpiperidinium bis(trifluoromethanesulfonyl)imide, 1-methyl-1-ethylpiperidinium bis(trifluoromethanesulfonyl)imide, 1-methyl-1-propylpiperidinium bis(trifluoromethanesulfonyl)imide, 1-methyl-1-butylpiperidinium bis(trifluoromethanesulfonyl)imide, 1-methyl-1-pentylpiperidinium bis(trifluoromethanesulfonyl)imide, 1-methyl-1-hexylpiperidinium bis(trifluoromethanesulfonyl)imide, 1-methyl-1-heptylpiperidinium bis(trifluoromethanesulfonyl)imide, 1-ethyl-1-propylpiperidinium bis(trifluoromethanesulfonyl)imide, 1-ethyl-1-butylpiperidinium bis(trifluoromethanesulfonyl)imide, 1-ethyl-1-pentylpiperidinium bis(trifluoromethanesulfonyl)imide, 1-ethyl-1-hexylpiperidinium bis(trifluoromethanesulfonyl)imide, 1-ethyl-1-heptylpiperidinium bis(trifluoromethanesulfonyl)imide, 1,1-dipropylpiperidinium bis(trifluoromethanesulfonyl)imide, 1-propyl-1-butylpiperidinium bis(trifluoromethanesulfonyl)imide, 1,1-dibutylpiperidinium bis(trifluoromethanesulfonyl)imide, 1,1-dimethylpyrrolidinium bis(pentafluoroethanesulfonyl)imide, 1-methyl-1-ethylpyrrolidinium bis(pentafluoroethanesulfonyl)imide, 1-methyl-1-propylpyrrolidiniumbis(pentafluoroethanesulfonyl)imide, 1-methyl-1-butylpyrrolidiniumbis(pentafluoroethanesulfonyl)imide, 1-methyl-1-pentylpyrrolidiniumbis(pentafluoroethanesulfonyl)imide, 1-methyl-1-hexylpyrrolidiniumbis(pentafluoroethanesulfonyl)imide, 1-methyl-1-heptylpyrrolidiniumbis(pentafluoroethanesulfonyl)imide, 1-ethyl-1-propylpyrrolidiniumbis(pentafluoroethanesulfonyl)imide, 1-ethyl-1-butylpyrrolidinium bis(pentafluoroethanesulfonyl)imide, 1-ethyl-1-pentylpyrrolidiniumbis(pentafluoroethanesulfonyl)imide, 1-ethyl-1-hexylpyrrolidinium bis(pentafluoroethanesulfonyl)imide, 1-ethyl-1-heptylpyrrolidiniumbis(pentafluoroethanesulfonyl)imide, 1,1-dipropylpyrrolidinium bis(pentafluoroethanesulfonyl)imide, 1-propyl-1-butylpyrrolidiniumbis(pentafluoroethanesulfonyl)imide, 1,1-dibutylpyrrolidinium bis(pentafluoroethanesulfonyl)imide, 1-propylpiperidinium bis(pentafluoroethanesulfonyl)imide, 1-pentylpiperidinium bis(pentafluoroethanesulfonyl)imide, 1,1-dimethylpiperidinium bis(pentafluoroethanesulfonyl)imide, 1-methyl-1-ethylpiperidinium bis(pentafluoroethanesulfonyl)imide, 1-methyl-1-propylpiperidiniumbis(pentafluoroethanesulfonyl)imide, 1-methyl-1-butylpiperidinium bis(pentafluoroethanesulfonyl)imide, 1-methyl-1-pentylpiperidiniumbis(pentafluoroethanesulfonyl)imide, 1-methyl-1-hexylpiperidinium bis(pentafluoroethanesulfonyl)imide, 1-methyl-1-heptylpiperidiniumbis(pentafluoroethanesulfonyl)imide, 1-ethyl-1-propylpiperidinium bis(pentafluoroethanesulfonyl)imide, 1-ethyl-1-heptylpiperidinium bis(pentafluoroethanesulfonyl)imide, 1-ethyl-1-pentylpiperidinium bis(pentafluoroethanesulfonyl)imide, 1-ethyl-1-hexylpiperidinium bis(pentafluoroethanesulfonyl)imide, 1-ethyl-1-heptylpiperidinium bis(pentafluoroethanesulfonyl)imide, 1-propyl-1-butylpiperidinium bis(pentafluoroethanesulfonyl)imide, 1,1-dipropylpiperidinium bis(pentafluoroethanesulfonyl)imide, and 1,1-dibutylpiperidinium bis(pentafluoroethanesulfonyl)imide.

Examples thereof further include derivatives of the above compounds, in which the onium moiety is replaced by trimethylsulfonium cation, triethylsulfonium cation, tributylsulfonium cation, trihexylsulfonium cation, diethylmethylsulfonium cation, dibutylethylsulfonium cation, dimethyldecylsulfonium cation, tetramethylphosphonium cation, tetraethylphosphonium cation, tetrabutylphosphonium cation, or tetrahexylphosphonium cation.

Examples thereof further include derivatives of the above compounds, in which bis(trifluoromethanesulfonyl)imide is replaced by bis(pentafluorosulfonyl)imide, bis(heptafluoropropanesulfonyl)imide, bis(nonafluorobutanesulfonyl)imide, trifluoromethanesulfonylnonafluorobutanesulfonylimide, heptafluoropropanesulfonyltrifluoromethanesulfonylimide, pentafluoroethanesulfonylnonafluorobutanesulfonylimide, or cyclo-hexafluoropropane-1,3-bis(sulfonyl)imide anion.

Any compound composed of a combination of any of the above onium components and any anionic component other than that for the fluorine-containing imide anion salt may be appropriately selected and used as the onium-anion salt (B1) not corresponding to the onium-fluorine-containing imide anion salt. Examples of the salt include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-hexylpyridinium tetrafluoroborate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazoliumtris(trifluoromethanesulfonyl)methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1-methylpyrazolium tetrafluoroborate, 3-methylpyrazolium tetrafluoroborate, diallyldimethylammonium tetrafluoroborate, diallyldimethylammonium trifluoromethanesulfonate, N,N-diethyl-N-methyl-N-(2-methoxyethyl) ammonium tetrafluoroborate, N,N-diethyl-N-methyl-N-(2-methoxyethyl)ammonium trifluoromethanesulfonate, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, N,N-diethyl-N-methyl-N-(2-methoxyethyl)ammonium (trifluoromethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, and 1-butyl-3-methylpyridin-1-ium trifluoromethanesulfonate.

The amount of the onium-anion salt (B1) in the pressure-sensitive adhesive composition according to the invention is preferably from 0.1 to 10 parts by weight based on 100 parts by weight of the (meth)acryl-based polymer (A). If the amount of the onium-anion salt (B1) is less than 0.1 parts by weight, the effect of improving antistatic performance may be insufficient. The amount of the onium-anion salt (B1) is preferably 0.2 parts by weight or more, more preferably 0.5 parts by weight or more. On the other hand, if the amount of the onium-anion salt (B1) is more than 10 parts by weight, durability may be insufficient. The amount of the onium-anion salt (B1) is preferably 7 parts by weight or less, more preferably 5 parts by weight or less, even more preferably 4 parts by weight or less, further more preferably 2 parts by weight or less. The amount of the onium-anion salt (B1) can be set in a preferred range, taking into account the above upper and lower limits.

[Alkali Metal Salt (B2)]

Any of organic and inorganic salts of alkali metals may be used as the alkali metal salt (B2).

The cation moiety of the alkali metal salt (B2) includes an alkali metal ion, which may be any of lithium, sodium, and potassium ions. Among these alkali metal ions, lithium ion is particularly preferred.

The anion moiety of the alkali metal salt may include an organic material or an inorganic material. Examples of the anion moiety that may be used to form the organic salt include $CH_3COO^-$, $CF_3COO^-$, $CH_3SO_3^-$, $CF_3SO_3^-$, $(CF_3SO_2)_3C^-$, $C_4F_9SO_3^-$, $C_3F_7COO^-$, $(CF_3SO_2)(CF_3CO)N^-$, $^-O_3S(CF_2)_3SO_3^-$, $PF_6^-$, and $CO_3^{2-}$, and those represented by the following general formulae (1) to (4):

  (1)

wherein n is an integer of 1 to 10;

  (2)

wherein m is an integer of 1 to 10;

  (3)

wherein l is an integer of 1 to 10; and

  (4)

wherein p and q are each an integer of 1 to 10. In particular, a fluorine atom-containing anion moiety is preferably used because it can form an ionic compound with good ionic dissociation properties. Examples of the anion moiety that may be used to form the inorganic salt include $Cl^-$, $Br^-$, $I^-$, $AlCl_4^-$, $Al_2Cl_7^-$, $BF_4^-$, $PF_6^-$, $ClO_4^-$, $NO_3^-$, $AsF_6^-$, $SbF_6^-$, $NbF_6^-$, $TaF_6^-$, and $(CN)_2N^-$. The anion moiety is preferably (perfluoroalkylsulfonyl)imide represented by the general formula (1), such as $(CF_3SO_2)_2N^-$ or $(C_2F_5SO_2)_2N^-$, in particular, preferably (trifluoromethanesulfonyl)imide such as $(CF_3SO_2)_2N^-$.

Examples of organic salts of alkali metals include sodium acetate, sodium alginate, sodium lignosulfonate, sodium toluenesulfonate, $LiCF_3SO_3$, $Li(CF_3SO_2)_2N$, $Li(CF_3SO_2)_2N$, $Li(C_2F_5SO_2)_2N$, $Li(C_4F_9SO_2)_2N$, $Li(CF_3SO_2)_3C$, $KO_3S(CF_2)_3SO_3K$, and $LiO_3S(CF_2)_3SO_3K$. Among them, $LiCF_3SO_3$, $Li(CF_3SO_2)_2N$, $Li(C_2F_5SO_2)_2N$, $Li(C_4F_9SO_2)_2N$, $Li(CF_3SO_2)_3C$, and the like are preferred, fluorine-containing lithium imide salts such as $Li(CF_3SO_2)_2N$, $Li(C_2F_5SO_2)_2N$, and $Li(C_4F_9SO_2)_2N$ are more preferred, and a (perfluoroalkylsulfonyl)imide lithium salt is particularly preferred.

Examples of inorganic salts of alkali metals include lithium perchlorate and lithium iodide.

The amount of the alkali metal salt (B2) of the pressure-sensitive adhesive composition according to the invention is preferably from 0.01 to 5 parts by weight based on 100 parts by weight of the (meth)acryl-based polymer (A). If the amount of the alkali metal salt (B2) is less than 0.1 parts by weight, the composition may fail to sufficiently suppress polarizer degradation after a humidity test under severe conditions. The amount of the alkali metal salt (B2) is preferably 0.05 parts by weight or more, more preferably 0.1 parts by weight or more. On the other hand, if the amount of the alkali metal salt (B2) is more than 10 parts by weight, the effect of improving antistatic performance may be insufficient after a humidity test under severe conditions. The amount of the alkali metal salt (B2) is preferably 1 part by weight or less, more preferably 0.5 parts by weight or less. The amount of the alkali metal salt (B2) can be set in a preferred range, taking into account the above upper and lower limits.

The pressure-sensitive adhesive composition of the invention also includes a crosslinking agent (C). An organic crosslinking agent or a polyfunctional metal chelate may also be used as the crosslinking agent (C). Examples of the organic crosslinking agent include an isocyanate crosslinking agent, an epoxy crosslinking agent, a peroxide crosslinking agent and an imine crosslinking agents. The polyfunctional metal chelate may include a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

The crosslinking agent (C) to be used is preferably selected from an isocyanate crosslinking agent and/or a peroxide crosslinking agent. Examples of such a compound for the isocyanate crosslinking agent include isocyanate monomers such as tolylene diisocyanate, chlorophenylene diisocyanate, tetramethylene diisocyanate, xylylene diisocyanate, diphenylmethane diisocyanate, and hydrogenated diphenylmethane diisocyanate, and isocyanate compounds produced by adding any of these isocyanate monomers to trimethylolpropane or the like; and urethane prepolymer type isocyanates produced by the addition reaction of isocyanurate compounds, burette type compounds, or polyether polyols, polyester polyols, acrylic polyols, polybutadiene polyols, polyisoprene polyols, or the like. Particularly preferred is a polyisocyanate compound such as one selected from the group consisting of hexamethylene diisocyanate, hydrogenated xylylene diisocyanate, and isophorone diisocyanate, or a derivative thereof. Examples of one selected from the group consisting of hexamethylene diisocyanate, hydrogenated xylylene diisocyanate, and isophorone diisocyanate, or a derivative thereof include hexamethylene diisocyanate, hydrogenated xylylene diisocyanate, isophorone diisocyanate, polyol-modified hexamethylene diisocyanate, polyol-modified hydrogenated xylylene diisocyanate, trimer-type hydrogenated xylylene diisocyanate, and polyol-modified isophorone diisocyanate. The listed polyisocyanate compounds are preferred, because their reaction with a hydroxyl group quickly proceeds as if an acid or a base contained in the polymer acts as a catalyst, which particularly contributes to the rapidness of the crosslinking.

Any peroxide capable of generating active radical species by heating or photoirradiation and promoting the crosslinking of the base polymer in the pressure-sensitive adhesive composition may be appropriately used. In view of workability and stability, a peroxide with a one-minute half-life temperature of 80° C. to 160° C. is preferably used, and a peroxide with a one-minute half-life temperature of 90° C. to 140° C. is more preferably used.

Examples of the peroxide for use in the invention include di(2-ethylhexyl) peroxydicarbonate (one-minute half-life temperature: 90.6° C.), di(4-tert-butylcyclohexyl) peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl) peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the amount of the peroxide to reach one half of its original value. The decomposition temperature required for a certain half life and the half life time obtained at a certain temperature are shown in catalogs furnished by manufacturers, such as "Organic Peroxide Catalog, 9th Edition, May, 2003" furnished by NOF CORPORATION.

The amount of the crosslinking agent (C) to be used is preferably from 0.01 to 20 parts by weight, more preferably from 0.03 to 10 parts by weight, based on 100 parts by weight of the (meth)acrylic polymer (A). If the amount of the crosslinking agent (C) is less than 0.01 parts by weight, the cohesive strength of the pressure-sensitive adhesive may tend to be insufficient, and foaming may occur during heating. If the amount of the crosslinking agent (C) is more than 20 parts by weight, the humidity resistance may be insufficient, so that peeling may easily occur in a reliability test or the like.

One of the isocyanate crosslinking agents may be used alone, or a mixture of two or more of the isocyanate crosslinking agents may be used. The total amount of the polyisocyanate compound crosslinking agent(s) is preferably from 0.01 to 2 parts by weight, more preferably from 0.02 to 2 parts by weight, even more preferably from 0.05 to 1.5 parts by weight, based on 100 parts by weight of the (meth)acrylic polymer (A). The content may be appropriately controlled taking into account the cohesive strength or the prevention of peeling in a durability test or the like.

One of the peroxide crosslinking agents may be used alone, or a mixture of two or more of the peroxide crosslinking agent may be used. The total amount of the peroxide(s) is preferably from 0.01 to 2 parts by weight, more preferably from 0.04 to 1.5 parts by weight, even more preferably from 0.05 to 1 part by weight, based on 100 parts by weight of the (meth)acrylic polymer (A). The amount of the peroxide(s) may be appropriately selected in this range in order to control the workability, reworkability, crosslink stability or peeling properties.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out, immersed in 10 ml of ethyl acetate, subjected to shaking extraction at 25° C. and 120 rpm for 3 hours in a shaker, and then allowed to stand at room temperature for 3 days. Thereafter, 10 ml of acetonitrile is added, and the mixture is shaken at 25° C. and 120 rpm for 30 minutes. About 10 µl of the liquid extract obtained by filtration through a membrane filter (0.45 µm) is subjected to HPLC by injection and analyzed so that the amount of the peroxide after the reaction process is determined.

The pressure-sensitive adhesive composition of the invention may further contain a silane coupling agent (D). The durability or the reworkability can be improved using the silane coupling agent (D). Examples of silane coupling agent include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, and 3-triethoxysilyl-N-(1,3-dimethylbutylidene)propylamine; (meth)acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane.

One of the silane coupling agents (D) may be used alone, or a mixture of two or more of the silane coupling agents. The total amount of the silane coupling agent(s) is preferably from 0.001 to 5 parts by weight, more preferably from 0.01 to 1 part by weight, even more preferably from 0.02 to 1 part by weight, still more preferably from 0.05 to 0.6 parts by weight, based on 100 parts by weight of the (meth)acrylic polymer (A). The amount of the silane coupling agent may be appropriately amount in order to control improve durability and maintain adhesive strength to the optical member such as a liquid crystal cell.

The pressure-sensitive adhesive composition according to the invention may further contain a polyether-modified silicone compound. The polyether-modified silicone compound may be, for example, that disclosed in JP-A-2010-275522.

The polyether-modified silicone compound has a polyether skeleton and a reactive silyl group represented by formula (1): —$SiR_aM_{3-a}$, at at least one terminal, wherein R represents a monovalent organic group having 1 to 20 carbon atoms and optionally having a substituent; M represents a hydroxyl group or a hydrolyzable group, and <a> represents an integer of 0 to 2, provided that in cases where two or more R groups, R groups is the same or different, and in cases where two or more M groups, M groups is the same or different.

The polyether-modified silicone compound may be a compound represented by formula (2): $R_aM_{3-a}Si$—X—Y—$(AO)_n$—Z, wherein R represents a monovalent organic group having 1 to 20 carbon atoms and optionally having a substituent, M represents a hydroxyl group or a hydrolyzable group; <a> represents an integer of 0 to 2, provided that in cases where two or more R groups, R groups is the same or different, and in cases where two or more M groups, M groups is the same or different, AO represents a straight- or branched-chain oxyalkylene group of 1 to 10 carbon atoms, n represents the average addition molar number of the oxyalkylene groups, which is from 1 to 1,700; X represents a straight- or branched-chain alkylene group of 1 to 20 carbon atoms, Y represents an ether bond, an ester bond, a urethane bond, or a carbonate bond and Z represents a hydrogen atom, a monovalent hydrocarbon group of 1 to 10 carbon atoms, a group represented by formula (2A): —$Y^1$—X—$SiR_aM_{3-a}$, wherein R, M and X have the same meanings as defined above; and $Y^1$ represents a single bond, a —CO— bond, a —CONH— bond, or a —COO— bond, or a group represented by formula (2B): -Q{-$(OA)_n$-Y—X—$SiR_aM_{3-a}\}_m$, wherein R, M, X, and Y have the same meanings as defined above, OA has the same meaning as AO defined above, n has the same meaning as defined above, Q represents a divalent or polyvalent hydrocarbon group of 1 to 10 carbon atoms, and m represents a number that is the same as the valence of the hydrocarbon group.

Specific examples of the polyether-modified silicone compound include MS Polymers 5203, 5303 and 5810 manufactured by Kaneka Corporation; SILYL EST250 and EST280 manufactured by Kaneka Corporation; SAT10, SAT200, SAT220, SAT350, and SAT400 manufactured by Kaneka Corporation; and EXCESTAR 52410, 52420 or 53430 manufacture by ASAHI GLASS CO., LTD.

The pressure-sensitive adhesive composition of the invention may also contain any other known additive. For example, a polyether compound of a polyalkylene glycol such as polypropylene glycol, a powder such as a colorant and a pigment, a tackifier, a dye, a surfactant, a plasticizer, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use. A redox system including an added reducing agent may also be used in the controllable range.

The pressure-sensitive adhesive composition is used to form a pressure-sensitive adhesive layer. To form the pressure-sensitive adhesive layer, it is preferred that the total amount of the addition of the crosslinking agent should be controlled and that the effect of the crosslinking temperature and the crosslinking time should be carefully taken into account.

The crosslinking temperature and the crosslinking time may be controlled depending on the crosslinking agent used. The crosslinking temperature is preferably 170° C. or less.

The crosslinking process may be performed at the temperature of the process of drying the pressure-sensitive adhesive layer, or the crosslinking process may be separately performed after the drying process.

The crosslinking time is generally from about 0.2 to about 20 minutes, preferably from about 0.5 to about 10 minutes, while it may be set taking into account productivity and workability.

In the pressure-sensitive adhesive layer attached polarizing film of the invention, a transparent protective film is provided on only one side of a polarizer, no transparent protective film is provided on other side of the polarizer, and a pressure-sensitive adhesive layer is formed on a side of the polarizer with the pressure-sensitive adhesive composition.

For example, the pressure-sensitive adhesive layer may be formed by a method including applying the pressure-sensitive adhesive composition to a release-treated separator or the like, removing the polymerization solvent and so on by drying to form a pressure-sensitive adhesive layer and then transferring it to a polarizing film, or by a method including applying the pressure-sensitive adhesive composition to a polarizing film and removing the polymerization solvent and so on by drying to form a pressure-sensitive adhesive layer on the polarizing film. Before the pressure-sensitive adhesive is applied, in addition at least one solvent other than the polymerization solvent may be added to the pressure-sensitive adhesive.

A silicone release liner is preferably used as the release-treated separator. The pressure-sensitive adhesive composition of the invention may be applied to such a liner and dried to form a pressure-sensitive adhesive layer. In this process, the pressure-sensitive adhesive may be dried using any appropriate method depending on the purpose. A method of drying by heating the coating film is preferably used. The heat drying temperature is preferably from 40° C. to 200° C., more preferably from 50° C. to 180° C., particularly preferably from 70° C. to 170° C. When the heating temperature is set in the above range, a pressure-sensitive adhesive having good adhesive properties can be obtained.

Any appropriate drying time may be used. The drying time is preferably from 5 seconds to 20 minutes, more preferably from 5 seconds to 10 minutes, particularly preferably from 10 seconds to 5 minutes.

An anchor layer may also be formed on the surface of the polarizing film or the surface of the optical film may be subjected to any of various adhesion-facilitating treatments such as a corona treatment and a plasma treatment, and then forming the pressure-sensitive adhesive layer. The surface of the pressure-sensitive adhesive layer may also be subjected to an adhesion-facilitating treatment.

Various methods may be used to form the pressure-sensitive adhesive layer. Specific examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is typically, but not limited to, from about 1 to 100 μm, preferably from 2 to 50 μm, more preferably from 2 to 40 μm, further preferably from 5 to 35 μm.

When the pressure-sensitive adhesive layer is exposed, the pressure-sensitive adhesive layer may be protected with a sheet having undergone release treatment (a separator) before practical use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 µm, preferably from about 5 to about 100 µm. If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased.

In the above production method, the release-treated sheet may be used without modification as a separator for the pressure-sensitive adhesive sheet, the pressure-sensitive adhesive layer-attached polarizing film or the like, so that the process can be simplified.

A polarizing film including a polarizer and a transparent protective film provided on one side of the polarizer is used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol-based film, partially formalized polyvinyl alcohol-based film, and ethylene-vinyl acetate copolymer-based partially saponified film; poly-ene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used. Although thickness of polarizer is not especially limited, the thickness of about 80 µm or less is commonly adopted.

A polarizer that is uniaxially stretched after a polyvinyl alcohol-based film dyed with iodine is obtained by stretching a polyvinyl alcohol-based film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thin polarizer with a thickness of 10 µm or less may also be used. In view of thinning, the thickness is preferably from 1 to 7 µm. Such a thin polarizer is less uneven in thickness, has good visibility, and is less dimensionally-variable and therefore has high durability. It is also preferred because it can form a thinner polarizing film. On the other hand, the polarization performance of the thin polarizer is more likely to degrade. In the pressure-sensitive adhesive layer attached polarizing film of the invention, the pressure-sensitive adhesive layer containing the onium-anion salt (B1) can provide an antistatic function without degrading optical properties. Even when produced with the thin polarizer, the pressure-sensitive adhesive layer attached polarizing film of the invention can suppress the degradation of polarizing properties.

Typical examples of such a thin polarizer include the thin polarizing layers disclosed in JP-A No. 51-069644, JP-A No. 2000-338329, WO2010/100917, specification of PCT/JP2010/001460, specification of Japanese Patent Application No. 2010-269002, or specification of Japanese Patent Application No. 2010-263692. These thin polarizing layers can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage, which would otherwise be caused by stretching of the layer supported on a stretchable resin substrate.

Among processes including the steps of stretching and dyeing a laminate, a process capable of high-ratio stretching to improve polarizing performance is preferably used to obtain the thin polarizing layer. Therefore, the thin polarizing layer is preferably obtained by a process including the step of stretching in an aqueous boric acid solution as disclosed in WO2010/100917, the specification of PCT/JP2010/001460, the specification of Japanese Patent Application No. 2010-269002, or the specification of Japanese Patent Application No. 2010-263692, in particular, preferably obtained by a process including the step of performing auxiliary in-air stretching before stretching in an aqueous boric acid solution as disclosed in the specification of Japanese Patent Application No. 2010-269002 or the specification of Japanese Patent Application or 2010-263692.

The specification of PCT/JP2010/001460 discloses a thin highly-functional polarizing layer that is formed integrally with a resin substrate, made of a PVA-based resin containing an oriented dichroic material, and has a thickness of 7 µm or less and the optical properties of a single transmittance of 42.0% or more and a degree of polarization of 99.95% or more.

This thin highly-functional polarizing layer can be produced by a process including forming a PVA-based resin coating on a resin substrate with a thickness of at least 20 µm, drying the coating to form a PVA-based resin layer, immersing the resulting PVA-based resin layer in a dyeing liquid containing a dichroic material to absorb the dichroic material to the PVA-based resin layer, and stretching the PVA-based resin layer, which contains the absorbed dichroic material, together with the resin substrate in an aqueous boric acid solution to a total stretch ratio of 5 times or more the original length.

A laminated film having a thin highly-functional polarizing layer containing an oriented dichroic material can be produced by a method including the steps of: coating a PVA-based resin-containing aqueous solution to one side of a resin substrate with a thickness of at least 20 μm, drying the coating to form a PVA-based resin layer so that a laminated film including the resin substrate and the PVA-based resin layer formed thereon is produced; immersing the laminated film in a dyeing liquid containing a dichroic material to absorb the dichroic material to the PVA-based resin layer in the laminated film, wherein the laminated film includes the resin substrate and the PVA-based resin layer formed on one side of the resin substrate; and stretching the laminated film, which has the PVA-based resin layer containing the absorbed dichroic material, in an aqueous boric acid solution to a total stretch ratio of 5 times or more the original length, wherein the PVA-based resin layer containing the absorbed dichroic material is stretched together with the resin substrate, so that a laminated film including the resin substrate and a thin highly-functional polarizing layer formed on one side of the resin substrate is produced, in which the thin highly-functional polarizing layer is made of the PVA-based resin layer containing the oriented dichroic material and has a thickness of 7 μm or less and the optical properties of a single transmittance of 42.0% or more and a degree of polarization of 99.95% or more.

In the pressure-sensitive adhesive layer-attached polarizing film according to an embodiment of the invention, the polarizer with a thickness of 10 μm or less may be a polarizing layer of a continuous web including a PVA-based resin containing an oriented dichroic material, which is obtained by a two-stage stretching process including auxiliary in-air stretching of a laminate and stretching of the laminate in an aqueous boric acid solution, wherein the laminate includes a thermoplastic resin substrate and a polyvinyl alcohol-based resin layer formed thereon. The thermoplastic resin substrate is preferably an amorphous ester-based thermoplastic resin substrate or a crystalline ester-based thermoplastic resin substrate.

The thin polarizing layer disclosed in the specification of Japanese Patent Application No. 2010-269002 or the specification of Japanese Patent Application No. 2010-263692 is a polarizing layer in the form of a continuous web including a PVA-based resin containing an oriented dichroic material, which is made with a thickness of 10 μm or less by a two-stage stretching process including auxiliary in-air stretching of a laminate and stretching of the laminate in an aqueous boric acid solution, wherein the laminate includes an amorphous ester-based thermoplastic resin substrate and a PVA-based resin layer formed thereon. This thin polarizing layer is preferably made to have optical properties satisfying the following requirements: $P > -(10^{0.929T-42.4}-1) \times 100$ (provided that $T<42.3$) and $P \geq 99.9$ (provided that $T \geq 42.3$), wherein T represents the single transmittance, and P represents the degree of polarization.

Specifically, the thin polarizing layer can be produced by a thin polarizing layer-manufacturing method including the steps of: performing elevated temperature in-air stretching of a PVA-based resin layer, so that a stretched intermediate product including an oriented PVA-based resin layer is produced, wherein the PVA-based resin layer is formed on an amorphous ester-based thermoplastic resin substrate in the form of a continuous web; absorbing a dichroic material (which is preferably iodine or a mixture of iodine and an organic dye) to the stretched intermediate product to produce a colored intermediate product including the PVA-based resin layer in which the dichroic material is oriented; and performing stretching of the colored intermediate product in an aqueous boric acid solution so that a polarizing layer with a thickness of 10 μm or less is produced, which includes the PVA-based resin layer containing the oriented dichroic material.

In this manufacturing method, the elevated temperature in-air stretching and the stretching in an aqueous boric acid solution are preferably performed in such a manner that the PVA-based resin layer formed on the amorphous ester-based thermoplastic resin substrate is stretched to a total stretch ratio of 5 times or more. The aqueous boric acid solution preferably has a temperature of 60° C. or more for the stretching therein. Before stretched in the aqueous boric acid solution, the colored intermediate product is preferably subjected to an insolubilization treatment, in which the colored intermediate product is preferably immersed in an aqueous boric acid solution with a temperature of 40° C. or less. The amorphous ester-based thermoplastic resin substrate may be made of amorphous polyethylene terephthalate including co-polyethylene terephthalate in which isophthalic acid, cyclohexanedimethanol, or any other monomer is copolymerized, and is preferably made of a transparent resin. The thickness of the substrate may be at least seven times the thickness of the PVA-based resin layer to be formed. The elevated temperature in-air stretching is preferably performed at a stretch ratio of 3.5 times or less, and the temperature of the elevated temperature in-air stretching is preferably equal to or higher than the glass transition temperature of the PVA-based resin. Specifically, it is preferably in the range of 95° C. to 150° C. When the elevated temperature in-air stretching is end-free uniaxial stretching, the PVA-based resin layer formed on the amorphous ester-based thermoplastic resin substrate is preferably stretched to a total stretch ratio of from 5 to 7.5 times. When the elevated temperature in-air stretching is fixed-end uniaxial stretching, the PVA-based resin layer formed on the amorphous ester-based thermoplastic resin substrate is preferably stretched to a total stretch ratio of from 5 to 8.5 times.

More specifically, the thin polarizing layer can be produced by the method described below.

A substrate in the form of a continuous web is prepared, which is made of co-polymerized polyethylene terephthalate (amorphous PET) in which 6 mol % of isophthalic acid is copolymerized. The amorphous PET has a glass transition temperature of 75° C. A laminate of a polyvinyl alcohol (PVA) layer and the amorphous PET substrate in the form of a continuous web is prepared as described below. Incidentally, the glass transition temperature of PVA is 80° C.

A 200 μm thick amorphous PET substrate is provided, and an aqueous 4-5% PVA solution is prepared by dissolving PVA powder with a polymerization degree of 1,000 or more and a saponification degree of 99% or more in water. Subsequently, the aqueous PVA solution is applied to a 200 μm thick amorphous PET substrate and dried at a temperature of 50 to 60° C. so that a laminate composed of the amorphous PET substrate and a 7 μm thick PVA layer formed thereon is obtained.

The laminate having the 7 μm thick PVA layer is subjected to a two-stage stretching process including auxiliary in-air stretching and stretching in an aqueous boric acid solution as described below, so that a thin highly-functional polarizing layer with a thickness of 3 μm is obtained. At the first stage, the laminate having the 7 μm thick PVA layer is subjected to an auxiliary in-air stretching step so that the layer is stretched together with the amorphous PET substrate to form a stretched laminate having a 5 μm thick PVA layer. Specifically, the stretched laminate is formed by a process including feeding the laminate having the 7 μm thick PVA layer to a stretching apparatus placed in an oven with the stretching temperature environment set at 130° C. and subjecting the laminate to end-free uniaxial stretching to a stretch ratio of 1.8 times. In the stretched laminate, the PVA layer is modified, by the stretching, into a 5 μm thick PVA layer containing oriented PVA molecules.

Subsequently, a dyeing step is performed to produce a colored laminate having a 5 μm thick PVA layer containing oriented PVA molecules and absorbed iodine. Specifically, the colored laminate is produced by immersing the stretched laminate for a certain time period in a dyeing liquid containing iodine and potassium iodide and having a temperature of 30° C. so that iodine can be absorbed to the PVA layer of the stretched laminate and that the PVA layer for finally forming a highly-functional polarizing layer can have a single transmittance of 40 to 44%. In this step, the dyeing liquid contains water as a solvent and has an iodine concentration in the range of 0.12 to 0.30% by weight and a potassium iodide concentration in the range of 0.7 to 2.1% by weight. The concentration ratio of iodine to potassium iodide is 1:7. It should be noted that potassium iodide is necessary to make iodine soluble in water. More specifically, the stretched laminate is immersed for 60 seconds in a dyeing liquid containing 0.30% by weight of iodine and 2.1% by weight of potassium iodide, so that a colored laminate is produced, in which the 5 μm thick PVA layer contains oriented PVA molecules and absorbed iodine.

At the second stage, the colored laminate is further subjected to a stretching step in an aqueous boric acid so that the layer is further stretched together with the amorphous PET substrate to form an optical film laminate having a 3 μm thick PVA layer, which forms a highly-functional polarizing layer. Specifically, the optical film laminate is formed by a process including feeding the colored laminate to a stretching apparatus placed in a treatment system in which an aqueous boric acid solution containing boric acid and potassium iodide is set in the temperature range of 60 to 85° C. and subjecting the laminate to end-free uniaxial stretching to a stretch ratio of 3.3 times. More specifically, the aqueous boric acid solution has a temperature of 65° C. In the solution, the boric acid content and the potassium iodide content are 4 parts by weight and 5 parts by weight, respectively, based on 100 parts by weight of water. In this step, the colored laminate having a controlled amount of absorbed iodine is first immersed in the aqueous boric acid solution for 5 to 10 seconds. Subsequently, the colored laminate is directly fed between a plurality of pairs of rolls different in peripheral speed, which form the stretching apparatus placed in the treatment system, and subjected to end-free uniaxial stretching for 30 to 90 seconds to a stretch ratio of 3.3 times. This stretching treatment converts the PVA layer of the colored laminate to a 3 μm thick PVA layer in which the absorbed iodine forms a polyiodide ion complex highly oriented in a single direction. This PVA layer forms a highly-functional polarizing layer in the optical film laminate.

A washing step, which is however not essential for the manufacture of the optical film laminate, is preferably performed, in which the optical film laminate is taken out of the aqueous boric acid solution, and boric acid deposited on the surface of the 3 μm thick PVA layer formed on the amorphous PET substrate is washed off with an aqueous potassium iodide solution. Subsequently, the washed optical film laminate is dried in a drying step using warm air at 60° C. It should be noted that the washing step is to prevent appearance defects such as boric acid precipitation.

A lamination and/or transfer step, which is also not essential for the manufacture of the optical film laminate, may also be performed, in which an 80 μm thick triacetylcellulose film is laminated to the surface of the 3 μm thick PVA layer formed on the amorphous PET substrate, while an adhesive is applied to the surface, and then the amorphous PET substrate is peeled off, so that the 3 μm thick PVA layer is transferred to the 80 μm thick triacetylcellulose film.

[Other Steps]

The thin polarizing layer-manufacturing method may include additional steps other than the above steps. For example, additional steps may include an insolubilization step, a crosslinking step, a drying step (moisture control), etc. Additional steps may be performed at any appropriate timing.

The insolubilization step is typically achieved by immersing the PVA-based resin layer in an aqueous boric acid solution. The insolubilization treatment can impart water resistance to the PVA-based resin layer. The concentration of boric acid in the aqueous boric acid solution is preferably from 1 to 4 parts by weight based on 100 parts by weight of water. The insolubilization bath (aqueous boric acid solution) preferably has a temperature of 20° C. to 50° C. Preferably, the insolubilization step is performed after the preparation of the laminate and before the dyeing step or the step of stretching in water.

The crosslinking step is typically achieved by immersing the PVA-based resin layer in an aqueous boric acid solution. The crosslinking treatment can impart water resistance to the PVA-based resin layer. The concentration of boric acid in the aqueous boric acid solution is preferably from 1 to 4 parts by weight based on 100 parts by weight of water. When the crosslinking step is performed after the dyeing step, an iodide is preferably added to the solution. The addition of an iodide can suppress the elution of absorbed iodine from the PVA-based resin layer. The amount of the addition of an iodide is preferably from 1 to 5 parts by weight based on 100 parts by weight of water. Examples of the iodide include those listed above. The temperature of the crosslinking bath (aqueous boric acid solution) is preferably from 20° C. to 50° C. Preferably, the crosslinking step is performed before the second stretching step in the aqueous boric acid solution. In a preferred embodiment, the dyeing step, the crosslinking step, and the second stretching step in the aqueous boric acid solution are performed in this order.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The amount of the thermoplastic resin in the transparent protective film is preferably from 50 to 100% by weight, more preferably from 50 to 99% by weight, still more preferably from 60 to 98% by weight, particularly preferably from 70 to 97% by weight. If the amount of the thermoplastic resin in the transparent protective film is 50% by weight or less, high transparency and other properties inherent in the thermoplastic resin can fail to be sufficiently exhibited.

The transparent protective film is bonded with an adhesive layer on one side of the polarizer. The polarizer and the transparent protective film are bonded together using an adhesive. For example, the adhesive may be an isocyanate-based adhesive, a polyvinyl alcohol-based adhesive, a gelatin-based adhesive, a vinyl latex-based adhesive, an aquatic polyester-based adhesive, or the like. The adhesive is generally used in the form of an aqueous solution, which generally has a solids amount of 0.5 to 60% by weight. Besides the above, the adhesive between the polarizer and the transparent protective film may also be an ultraviolet-curable adhesive, an electron beam-curable adhesive, or the like. Electron beam-curable adhesives for polarizing films have good tackiness to the above various transparent protective films. The adhesive for use in the invention may also contain metal compound filler.

Further the polarizing film may laminate with other optical film. The other optical film may be used as optical layers, such as a reflective plate, a transflective plate, a retardation film (a half wavelength plate and a quarter wavelength plate included), and a viewing angle compensation film, which may be used for formation of a liquid crystal display etc. These are used in practice as one layer or two layers or more of optical layers laminated with polarizing film.

Although an optical film with the above described optical layer laminated to the polarizing film may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as a pressure-sensitive adhesive layer, may be used for laminating. On the occasion of adhesion of the above described polarizing film and other optical layers, the optical axis may be set as a suitable configuration angle according to the target retardation characteristics etc.

The pressure-sensitive adhesive layer-attached polarizing film of the invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive layer-attached polarizing film and optionally other component such as a lighting system and incorporating a driving circuit according to any conventional technique, except that the pressure-sensitive adhesive layer-attached polarizing film of the invention is used. Any type of liquid crystal cell may also be used such as a TN type, an STN type, a π type a VA type and IPS type.

Suitable liquid crystal displays, such as liquid crystal display with which the pressure-sensitive adhesive layer-attached polarizing film has been located at one side or both sides of the liquid crystal cell, and with which a backlight or a reflective plate is used for a lighting system may be manufactured. In this case, the pressure-sensitive adhesive layer-attached polarizing film may be installed in one side or both sides of the liquid crystal cell. When installing the optical films in both sides, they may be of the same type or of different type. Furthermore, in assembling a liquid crystal display, suitable parts, such as diffusion layer, anti-glare layer, antireflection film, protective plate, prism array, lens array sheet, optical diffusion sheet, and backlight, may be installed in suitable position in one layer or two or more layers.

EXAMPLES

The invention is more specifically described by the examples below, which are not intended to limit the scope of the invention. In each example, parts and % are all by weight. Unless otherwise stated below, the conditions of room temperature standing are 23° C. and 65% RH in all the cases.

<Measurement of Weight Average Molecular Weight of (Meth)acrylic Polymer (A)>

The weight average molecular weight (Mw) of the (meth) acrylic polymer (A) was measured by GPC (Gel Permeation Chromatography).

Analyzer: HLC-8120GPC manufactured by TOSOH CORPORATION
Columns: G7000H$_{XL}$+GMH$_{XL}$+GMH$_{XL}$, manufactured by TOSOH CORPORATION
Column size: each 7.8 mmφ×30 cm, 90 cm in total
Column temperature: 40° C.
Flow rate: 0.8 ml/minute
Injection volume: 100 μl
Eluent: tetrahydrofuran
Detector: differential refractometer (RI)
Standard sample: polystyrene <Preparation of Polarizing Film (1)>

A process for forming a thin polarizing layer was performed. In the process, a laminate including an amorphous PET substrate and a 9 μm thick PVA layer formed thereon was first subjected to auxiliary in-air stretching at a stretching temperature of 130° C. to form a stretched laminate. Subsequently, the stretched laminate was subjected to dyeing to form a colored laminate, and the colored laminate was subjected to stretching in an aqueous boric acid solution at a stretching temperature of 65° C. to a total stretch ratio of 5.94 times, so that an optical film laminate was obtained, which had a 4 μm thick PVA layer stretched together with the amorphous PET substrate. Such two-stage stretching successfully formed an optical film laminate having a 4 μm thick PVA layer, which was formed on the amorphous PET substrate, contained highly oriented PVA molecules, and formed a highly-functional polarizing layer in which iodine absorbed by the dyeing formed a polyiodide ion complex oriented highly in a single direction. An 40 μm thick saponified triacetylcellulose film was further attached to the surface of the polarizing layer of the optical film laminate, while a polyvinyl alcohol-based adhesive was applied to the surface, and then the amorphous PET substrate was peeled off, so that a polarizing film with a thin polarizing layer was obtained. Hereinafter, this is referred to as thin polarizing film (1).

(Preparation of Polarizing Film (2))

An 80 μm-thick polyvinyl alcohol film was stretched to 3 times between rolls different in velocity ratio, while it was dyed in a 0.3% iodine solution at 30° C. for 1 minute. The film was then stretched to a total stretch ratio of 6 times, while it was immersed in an aqueous solution containing 4% of boric acid and 10% of potassium iodide at 60° C. for 0.5 minutes. The film was then washed by immersion in an aqueous solution containing 1.5% of potassium iodide at 30° C. for 10 seconds and then dried at 50° C. for 4 minutes to give a polarizer with a thickness of 20 μm. Saponified triacetylcellulose films each with a thickness of 40 μm was bonded to one side of the polarizer with a polyvinyl alcohol adhesive to form a polarizing film. Hereinafter, this is referred to as ordinary polarizing film (2).

Production Example 1

<Preparation of Acryl-Based Polymer (A-1)>

To a four-neck flask equipped with a stirring blade, a thermometer, a nitrogen gas introducing tube, and a condenser were added a monomer mixture containing 99 parts of butyl acrylate and 1 part of 4-hydroxybutyl acrylate. Based on 100 parts (solid basis) of the monomer mixture, 0.1 parts of 2,2'-azobisisobutyronitrile as a polymerization initiator was further added together with ethyl acetate. Nitrogen gas was introduced to replace the air, while the mixture was gently stirred, and then a polymerization reaction was performed for 7 hours, while the temperature of the liquid in the flask was kept at about 60° C. Subsequently, ethyl acetate was added to the resulting reaction liquid to adjust the solids content to 30%, so that a solution of an acryl-based polymer (A-1) with a weight average molecular weight of 1,400,000 was obtained.

Production Example 2

<Preparation of Acryl-Based Polymer (A-2)>

To a four-neck flask equipped with a stirring blade, a thermometer, a nitrogen gas introducing tube, and a condenser were added a monomer mixture containing 99 parts of butyl acrylate, 0.5 parts of 2-hydroxyethyl acrylate and 0.5 parts of acrylic acid. Based on 100 parts (solid basis) of the monomer mixture, 0.1 parts of 2,2'-azobisisobutyronitrile as a polymerization initiator was further added together with ethyl acetate. Nitrogen gas was introduced to replace the air, while the mixture was gently stirred, and then a polymerization reaction was performed for 7 hours, while the temperature of the liquid in the flask was kept at about 60° C. Subsequently, ethyl acetate was added to the resulting reaction liquid to adjust the solids content to 30%, so that a solution of an acryl-based polymer (A-2) with a weight average molecular weight of 1,400,000 was obtained.

Example 1

(Preparation of Pressure-Sensitive Adhesive Composition)

Based on 100 parts of the solids of the acryl-based polymer (A-1) solution obtained in Production Example 1, 0.2 parts of ethylmethylpyrrolidinium bis(trifluoromethanesulfonyl)imide (manufactured by Tokyo Chemical Industry Co., Ltd.), 0.2 parts of lithium bis(trifluoromethanesulfonyl) imide (manufactured by Mitsubishi Materials Electronic Chemicals Co., Ltd), 0.1 parts of trimethylolpropane xylylene diisocyanate (Takenate D110N, manufactured by Mitsui Chemicals, Inc.), 0.3 parts of dibenzoyl peroxide, and 0.075 parts of γ-glycidoxypropylmethoxysilane (KBM-403, manufactured by Shin-Etsu Chemical Co., Ltd.) were added to the acryl-based polymer (A-1) solution, so that an acryl-based pressure-sensitive adhesive solution was obtained.

(Preparation of Pressure-Sensitive Adhesive Layer-Attached Polarizing Film

Subsequently, the acryl-based pressure-sensitive adhesive solution was uniformly applied to the surface of a silicone release agent-treated polyethylene terephthalate film (separator film) with a fountain coater, and dried for 2 minutes in an air circulation-type thermostat oven at 155° C., so that a 20 μm thick pressure-sensitive adhesive layer was formed on the surface of the separator film. Subsequently, the pressure-sensitive adhesive layer was transferred from the separator film to the polarizing layer side that is a polarizer of the thin polarizing film (1) prepared as described above, so that a pressure-sensitive adhesive layer-attached polarizing film was obtained.

Examples 2 to 23 and Comparative Examples 1 to 5

Pressure-sensitive adhesive layer-attached polarizing films were prepared as in Example 1, except that in the preparation of the pressure-sensitive adhesive composition, the amount or type of each component were changed as shown in Table 1 and 2 and that in the preparation of the pressure-sensitive adhesive layer-attached polarizing film, the type of the polarizing film was changed as shown in Table 1.

The pressure-sensitive adhesive layer-attached polarizing film obtained in each of the examples and the comparative examples was evaluated as described below. The results of the evaluation are shown in Table 1 and 2.

<Surface Resistance>

After the separator film was peeled off from the pressure-sensitive adhesive layer attached polarizing film, the surface resistance (Ω/square) (initial) of the pressure-sensitive adhesive surface was measured with MCP-HT450 manufactured by Mitsubishi Chemical Analytech Co., Ltd. The pressure-sensitive adhesive layer attached polarizing film was then stored for 48 hours in a thermo-hygrostat under the conditions of 60° C. and 95% RH. After the storage, the surface resistance (after intense humidification) of the pressure-sensitive adhesive surface was also measured in the same way. The surface resistance is preferably $5.0 \times 10^{12}$ Ω/square or less, more preferably $1.0 \times 10^{12}$ Ω/square or less.

<Evaluation of Static Electricity-Induced Unevenness>

The prepared pressure-sensitive adhesive layer-attached polarizing film was cut into a piece with a size of 100 mm×100 mm, which was bonded to a liquid crystal panel. The panel was placed on a backlight with a brightness of 10,000 cd, and the orientation of the liquid crystal was disturbed using 5 kV static electricity produced by an electrostatic generator, ESD, (ESD-8012A, manufactured by Sanki Electronic Industries Co., Ltd.). The time required for recovery from the orientation failure-induced display failure was measured using an instantaneous multichannel photodetector system (MCPD-3000, manufactured by Otsuka Electronics Co., Ltd.), and evaluated (initial) according to the criteria below.

The pressure-sensitive adhesive layer attached polarizing film was then stored for 48 hours in a thermo-hygrostat under the conditions of 60° C. and 95% RH. After the storage, the pressure-sensitive adhesive layer attached polarizing film was also evaluated (intense humidification) in the same way.

⊙: Display failure was eliminated in a time of less than one second.

○: Display failure was eliminated in a time of one second to less than 10 seconds.

x: Display failure was eliminated in a time of 10 seconds or more.

<Durability>

The separator film was peeled off from the pressure-sensitive adhesive layer-attached polarizing film, and the polarizing film was bonded to a 0.7 mm thick non-alkali glass plate (1737, manufactured by Corning Incorporated) using a laminator. Subsequently, the laminate was autoclaved at 50° C. and 5 atm for 15 minutes, so that the pressure-sensitive adhesive layer-attached polarizing film was completely bonded to the non-alkali glass plate. Subsequently, the laminate was stored in a heating oven at 85° C. (heating) and stored in a thermo-hygrostat under the conditions of 60° C./95% RH (intense humidification), respectively, and after 500 hours, the presence or absence of peeling of the polarizing film was evaluated according to the criteria below.

⊚: No peeling was detected at all.
○: Peeling was detected at an invisible level.
Δ: Visible small peeling was detected.
x: Significant peeling was detected.

<Measurement of Degree of Polarization>

The separator film was peeled off from the pressure-sensitive adhesive layer-attached polarizing film, and the polarizing film was bonded to a 0.7 mm thick non-alkali glass plate (1737, manufactured by Corning Incorporated) using a laminator. Subsequently, the laminate was autoclaved at 50° C. and 0.5 MPa for 15 minutes, so that the pressure-sensitive adhesive layer-attached polarizing film was completely bonded to the non-alkali glass plate. Subsequently, the laminate was stored in a thermo-hygrostat under the conditions of 60° C./90% RH (humidification), and stored in a thermo-hygrostat under the conditions of 60° C./95% RH (intense humidification), respectively, for 500 hours. Before and after the storage, the degree of polarization of the polarizing film was measured with V-7100 manufactured by JASCO Corporation, and then the change ΔP in the degree of polarization=(the degree of polarization before the storage)–(the degree of polarization after the storage) was calculated. After any of the humidification and the intense humidification, the change ΔP should preferably be less than 0.15, more preferably 0.05 or less.

TABLE 1

| | Polarizing film | | Pressure-sensitive adhesive composition | | | | | | | | | | | | | Evaluations | | | | | | | |
|---|---|---|---|---|---|---|---|---|---|---|---|---|---|---|---|---|---|---|---|---|---|---|---|
| | | | (Meth)acryl-based polymer (A) | | Onium-anion salt (B1) | | Alkali metal salt (B2) | | Crosslinking agent (C) | | | | Silane coupling agent (D) | | Additional compound (E) | | Surface resistance (Ω/square) | | Static electricity-induced unevenness | | Durability | | Polarization degree reduction ΔP | |
| | | | | | | | | | Isocyanate compound | | Peroxide | | | | | | | | | | | | | |
| | Type | thickness (μm) | Type | Parts | Type | Parts | Type | Parts | Type | Parts | Type | Parts | Type | Parts | Type | Parts | Initial | Intense humidification | Initial | Intense humidification | Heating | Intense humidification | Humidification | Intense humidification |
| Example 1 | Thin polarizing film (1) | 4 | A-1 | 100 | B1-1 | 0.2 | B2-1 | 0.2 | C-1 | 0.1 | C-2 | 0.3 | D-1 | 0.075 | | | 2.0E+12 | 2.2E+12 | ○ | ○ | ◉ | ◉ | 0.01 | 0.02 |
| Example 2 | Thin polarizing film (1) | 4 | A-1 | 100 | B1-1 | 0.5 | B2-1 | 0.2 | C-1 | 0.1 | C-2 | 0.3 | D-1 | 0.075 | | | 7.9E+11 | 8.7E+11 | ◉ | ◉ | ◉ | ◉ | 0.01 | 0.02 |
| Example 3 | Thin polarizing film (1) | 4 | A-1 | 100 | B1-1 | 1 | B2-1 | 0.2 | C-1 | 0.1 | C-2 | 0.3 | D-1 | 0.075 | | | 2.0E+11 | 2.2E+11 | ◉ | ◉ | ◉ | ◉ | 0.01 | 0.02 |
| Example 4 | Thin polarizing film (1) | 4 | A-1 | 100 | B1-1 | 4 | B2-1 | 0.2 | C-1 | 0.1 | C-2 | 0.3 | D-1 | 0.075 | | | 5.8E+09 | 6.3E+09 | ◉ | ◉ | ◉ | ◉ | 0.01 | 0.02 |
| Example 5 | Thin polarizing film (1) | 4 | A-1 | 100 | B1-1 | 7 | B2-1 | 0.2 | C-1 | 0.1 | C-2 | 0.3 | D-1 | 0.075 | | | 3.1E+09 | 3.4E+09 | ◉ | ◉ | ○ | ○ | 0.01 | 0.02 |
| Example 6 | Thin polarizing film (1) | 4 | A-1 | 100 | B1-1 | 1 | B2-1 | 0.02 | C-1 | 0.1 | C-2 | 0.3 | D-1 | 0.075 | | | 2.0E+11 | 2.2E+11 | ◉ | ◉ | ◉ | ◉ | 0.02 | 0.07 |
| Example 7 | Thin polarizing film (1) | 4 | A-1 | 100 | B1-1 | 1 | B2-1 | 0.05 | C-1 | 0.1 | C-2 | 0.3 | D-1 | 0.075 | | | 2.0E+11 | 2.2E+11 | ◉ | ◉ | ◉ | ◉ | 0.02 | 0.05 |
| Example 8 | Thin polarizing film (1) | 4 | A-1 | 100 | B1-1 | 1 | B2-1 | 0.1 | C-1 | 0.1 | C-2 | 0.3 | D-1 | 0.075 | | | 2.0E+11 | 2.2E+11 | ◉ | ◉ | ◉ | ◉ | 0.01 | 0.02 |
| Example 9 | Thin polarizing film (1) | 4 | A-1 | 100 | B1-1 | 1 | B2-1 | 0.5 | C-1 | 0.1 | C-2 | 0.3 | D-1 | 0.075 | | | 2.0E+11 | 2.2E+11 | ◉ | ◉ | ◉ | ◉ | 0.01 | 0.02 |
| Example 10 | Thin polarizing film (1) | 4 | A-1 | 100 | B1-1 | 1 | B2-1 | 1 | C-1 | 0.1 | C-2 | 0.3 | D-1 | 0.075 | | | 8.1E+10 | 8.9E+10 | ◉ | ◉ | ◉ | ◉ | 0.01 | 0.02 |
| Example 11 | Thin polarizing film (1) | 4 | A-1 | 100 | B1-1 | 1 | B2-1 | 4 | C-1 | 0.1 | C-2 | 0.3 | D-1 | 0.075 | | | 2.1E+10 | 2.3E+10 | ◉ | ◉ | ○ | ○ | 0.01 | 0.02 |
| Example 12 | Thin polarizing film (1) | 4 | A-2 | 100 | B1-1 | 1 | B2-1 | 0.2 | C-1 | 0.1 | C-2 | 0.3 | D-1 | 0.075 | | | 2.0E+11 | 3.4E+11 | ◉ | ◉ | ◉ | ◉ | 0.06 | 0.07 |
| Example 13 | Thin polarizing film (1) | 4 | A-1 | 100 | B1-1 | 1 | B2-1 | 0.2 | C-1 | 0.1 | C-2 | 0.3 | D-1 | 0.075 | E-1 | 0.5 | 2.1E+11 | 2.3E+11 | ◉ | ◉ | ◉ | ◉ | 0.01 | 0.02 |
| Example 14 | Normal polarizing film (2) | 20 | A-1 | 100 | B1-1 | 1 | B2-1 | 0.2 | C-1 | 0.1 | C-2 | 0.3 | D-1 | 0.075 | | | 2.1E+11 | 2.3E+11 | ◉ | ◉ | ○ | ○ | 0.01 | 0.02 |
| Example 15 | Thin polarizing film (1) | 4 | A-1 | 100 | B1-1 | 1 | B2-1 | 0.2 | C-1 | 0.2 | C-2 | 0.3 | D-1 | 0.075 | | | 2.0E+11 | 2.1E+11 | ◉ | ◉ | ◉ | ◉ | 0.01 | 0.02 |
| Example 16 | Thin polarizing film (1) | 4 | A-1 | 100 | B1-1 | 1 | B2-1 | 0.2 | C-1 | 0.1 | | | D-1 | 0.075 | | | 2.0E+11 | 2.2E+11 | ◉ | ◉ | ◉ | ◉ | 0.01 | 0.02 |
| Example 17 | Thin polarizing film (1) | 4 | A-1 | 100 | B1-1 | 1 | B2-1 | 1 | C-1 | 0.1 | C-2 | 0.3 | | | E-2 | 0.5 | 2.1E+11 | 2.3E+11 | ◉ | ◉ | △ | △ | 0.02 | 0.05 |
| Comparative Example 1 | Thin polarizing film (1) | 4 | A-1 | 100 | | | | | C-1 | 0.1 | C-2 | 0.3 | D-1 | 0.075 | | | >10¹³ | >10¹³ | X | X | ◉ | ◉ | 0.01 | 0.02 |

TABLE 1-continued

| | Polarizing film | | | | Pressure-sensitive adhesive composition | | | | | | | | | | | | | Evaluations | | | | | | | |
|---|---|---|---|---|---|---|---|---|---|---|---|---|---|---|---|---|---|---|---|---|---|---|---|---|---|
| | | Po-larizer thick-ness (μm) | (Meth)acryl-based polymer (A) | | Onium-anion salt (B1) | | Alkali metal salt (B2) | | Crosslinking agent (C) | | | | Silane coupling agent (D) | | Additional compound (E) | | Surface resistance (Ω/square) | | Static electricity-induced unevenness | | Durability | | Polarization degree reduction ΔP | |
| | | | | | | | | | Isocyanate compound | | Peroxide | | | | | | | | | | | | | |
| Type | | | Type | Parts | Type | Parts | Type | Parts | Type | Parts | Type | Parts | Type | Parts | Type | Parts | Initial | Intense humidi-fication | Initial | Intense humidi-fication | Heating | Intense humidi-fication | Humidi-fication | Intense humidi-fication |
| Compar-ative Example 2 | Thin polarizing film (1) | 4 | A-1 | 100 | B1-1 | 1 | | | C-1 | 0.1 | C-2 | 0.3 | D-1 | 0.075 | | | 2.0E+11 | 2.2E+11 | ⊙ | ⊙ | ⊙ | ⊙ | 0.02 | 0.08 |
| Compar-ative Example 3 | Thin polarizing film (1) | 4 | A-1 | 100 | | | B2-1 | 0.2 | C-1 | 0.1 | C-2 | 0.3 | D-1 | 0.075 | | | 3.3E+12 | 8.7E+12 | ○ | X | ⊙ | ⊙ | 0.01 | 0.02 |
| Compar-ative Example 4 | Thin polarizing film (1) | 4 | A-1 | 100 | | | B2-1 | 1 | C-1 | 0.1 | C-2 | 0.3 | D-1 | 0.075 | | | 2.3E+11 | 5.3E+13 | ⊙ | X | ⊙ | ⊙ | 0.01 | 0.02 |

B1-1 Ethylnethylpyrrolidinium bis(trifluoromethanesulfonyl)imide manufactured by Tokyo Chemical Industry Co., Ltd.
B2-1 Lithium bis(trifluoromethanesulfonyl)imide manufactured by Mitsubishi Materials Electronic Chemicals Co., Ltd.
E-1 SILYL SAT10 (4,000 in number average molecular weight) manufactured by Kaneka Corporation
E-2 Polypropylene glycol (5,000 in number average molecular weight) manufactured by Wako Pure Chemical Industries, Ltd.

TABLE 2

| | Polarizing film | | Pressure-sensitive adhesive composition | | | | | | | | | | | |
|---|---|---|---|---|---|---|---|---|---|---|---|---|---|---|
| | | | (Meth)acryl-based polymer (A) | | Onium-anion salt (B1) | | Alkali metal salt (B2) | | Crosslinking agent (C) | | | | Silane coupling agent (D) | | Additional compound (E) | |
| | | Polarizer thickness | | | | | | | Isocyanate compound | | Peroxide | | | | | |
| | Type | (μm) | Type | Parts | Type | Parts | Type | Parts | Type | Parts | Type | Parts | Type | Parts | Type | Parts |
| Example 18 | Thin polarizing film (1) | 4 | A-1 | 100 | B1-2 | 1 | B2-1 | 0.2 | C-1 | 0.1 | C-2 | 0.3 | D-1 | 0.075 | | |
| Example 19 | Thin polarizing film (1) | 4 | A-1 | 100 | B1-3 | 1 | B2-1 | 0.2 | C-1 | 0.1 | C-2 | 0.3 | D-1 | 0.075 | | |
| Example 20 | Thin polarizing film (1) | 4 | A-1 | 100 | B1-4 | 1 | B2-1 | 0.2 | C-1 | 0.1 | C-2 | 0.3 | D-1 | 0.075 | | |
| Example 21 | Thin polarizing film (1) | 4 | A-1 | 100 | B1-5 | 1 | B2-1 | 0.2 | C-1 | 0.1 | C-2 | 0.3 | D-1 | 0.075 | | |
| Example 22 | Thin polarizing film (1) | 4 | A-1 | 100 | B1-6 | 1 | B2-1 | 0.2 | C-1 | 0.1 | C-2 | 0.3 | D-1 | 0.075 | | |
| Example 23 | Thin polarizing film (1) | 4 | A-1 | 100 | B1-1 | 1 | B2-2 | 0.2 | C-1 | 0.1 | C-2 | 0.3 | D-1 | 0.075 | | |
| Comparative Example 5 | Thin polarizing film (1) | 4 | A-1 | 100 | B1-6 | 1 | | | C-1 | 0.1 | C-2 | 0.3 | D-1 | 0.075 | | |

| | Evaluations | | | | | | | |
|---|---|---|---|---|---|---|---|---|
| | Surface resistance (Ω/square) | | Static electricity-induced unevenness | | | Durability | | Polarization degree reduction ΔP |
| | | Intense | | Intense | | | | |
| | Initial | humidification | Initial | humidification | Heating | Intense humidification | Humidification | Intense humidification |
| Example 18 | 2.1E+11 | 2.3E+11 | ⊙ | ⊙ | ⊙ | ⊙ | 0.01 | 0.03 |
| Example 19 | 2.4E+11 | 2.7E+11 | ⊙ | ⊙ | ⊙ | ⊙ | 0.01 | 0.05 |
| Example 20 | 2.3E+11 | 2.6E+11 | ⊙ | ⊙ | ⊙ | ⊙ | 0.01 | 0.05 |
| Example 21 | 2.1E+11 | 2.3E+11 | ⊙ | ⊙ | ⊙ | ⊙ | 0.06 | 0.08 |
| Example 22 | 2.1E+11 | 2.3E+11 | ⊙ | ⊙ | ⊙ | ⊙ | 0.10 | 0.13 |
| Example 23 | 2.0E+11 | 2.2E+11 | ⊙ | ⊙ | ⊙ | ⊙ | 0.05 | 0.07 |
| Comparative Example 5 | 2.1E+11 | 2.3E+11 | ⊙ | ⊙ | ⊙ | ⊙ | 0.12 | 0.15 |

B1-1 Ethylmethylpyrrolidinium bis(trifluoromethanesulfonyl)imide manufactured by Tokyo Chemical Industry Co., Ltd.
B1-2 Methylpropylpyrrolidinium bis(trifluoromethanesulfonyl)imide manufactured by Tokyo Chemical Industry Co., Ltd.
B1-3 Trimethylpropylammonium bis(trifluoromethanesulfonyl)imide manufactured by Tokyo Chemical Industry Co., Ltd.
B1-4 Triethylsulfonium bis(trifluoromethanesulfonyl)imide manufactured by Tokyo Chemical Industry Co., Ltd.
B1-5 Trioctylpropylammonium bis(trifluoromethanesulfonyl)imide manufactured by Tokyo Chemical Industry Co., Ltd.
B1-6 1-butyl-3-methylpyridinium bis(trifluoromethanesulfonyl)imide manufactured by Tokyo Chemical Industry Co., Ltd.
B2-1 Lithium bis(trifluoromethanesulfonyl)imide manufactured by Mitsubishi Materials Electronic Chemicals Co., Ltd.
B2-2 Potassium bis(trifluoromethanesulfonyl)imide manufactured by Mitsubishi Materials Electronic Chemicals Co., Ltd.

In Tables 1 and 2, C-1 represents trimethylolpropane xylylene diisocyanate (Takenate D110N manufactured by Mitsui Chemicals, Inc.), C-2 dibenzoyl peroxide, and D-1 γ-glycidoxypropylmethoxysilane (KBM-403 manufactured by Shin-Etsu Chemical Co., Ltd.).

The results of the examples and Comparative Examples 2 and 5 show that when the onium-anion salt (B1) was used as an ionic compound, good antistatic performance and good durability can be obtained, and the reduction ΔP in polarization degree can be suppressed under humid conditions. Comparisons between Examples 1 to 17 and Comparative Example 2 and between Example 22 and Comparative Example 5 show that when the onium-anion salt (B1) and the alkali metal salt (B2) were used as ionic compounds, as used in the examples, the reduction ΔP in polarization degree can also be suppressed under highly humid conditions. In Comparative Examples 3 and 4 using only the alkali metal salt (B2) as an ionic compound, however, the antistatic performance under highly humid conditions is not sufficient, and the problem of static electricity-induced unevenness is not overcome, although the reduction ΔP in polarization degree is suppressed under highly humid conditions.

The invention claimed is:
1. A pressure-sensitive adhesive layer attached polarizing film, comprising:
   a polarizing film; and
   a pressure-sensitive adhesive layer provided on the polarizing film, wherein
   the polarizing film comprises a polarizer and a transparent protective film provided on only one side of the polarizer, the pressure-sensitive adhesive layer is provided on a side of the polarizer opposite to the side on which the transparent protective film is provided, and
   the pressure-sensitive adhesive layer is made from a pressure-sensitive adhesive composition consisting of a (meth)acryl-based polymer (A), an onium-anion salt (B1), and more than 0.1 to 5 parts by weight of an alkali metal salt (B2) based on 100 parts by weight of the (meth)acryl-based polymer (A) and
   optionally at least one component selected from the group consisting of a crosslinking agent (C), a silane coupling agent (D), a polyether-modified silicone compound, a polyether compound of a polyalkylene glycol, a colorant, a pigment, a tackifier, a dye, a surfactant, a plasticizer, a surface lubricant, a leveling agent, a softening agent, a polymerization inhibitor, an inorganic or organic filler, and a redox system including a reducing agent, wherein an anion moiety of the alkali metal salt(B2) is at least one consisting of the group represented by the following general formulae (1) to (1) $(CF_nF_{2n+1}SO_2)_2N^-$, wherein n is an integer of 1 to 10;

$$CF_2(C_mF_{2m}SO_2)_2N^-, \quad (2)$$

wherein m is an integer of 1 to 10;

$$^-O_3S(CF_2)_lSO_3^-, \quad (3)$$

wherein l is an integer of 1 to 10; and $$(C_pF_{2p+1}SO_2)N^-(C_qF_{2q+1}SO_2), \quad (4)$$

wherein p and q are each an integer of 1 to 10.

2. The pressure-sensitive adhesive layer attached polarizing film according to claim 1, wherein the onium-anion salt (B1) is an onium-fluorine-containing imide anion salt.

3. The pressure-sensitive adhesive layer attached polarizing film according to claim 1, wherein the onium of the onium-anion salt (B1) is at least one selected from a nitrogen-containing onium, a sulfur-containing onium, and a phosphorus-containing onium.

4. The pressure-sensitive adhesive layer attached polarizing film according to claim 3, wherein the onium of the onium-anion salt (B1) is at least one selected from ammonium, pyrrolidinium, piperidinium, and sulfonium.

5. The pressure-sensitive adhesive layer attached polarizing film according to claim 4, wherein the onium of the onium-anion salt (B1) is pyrrolidinium.

6. The pressure-sensitive adhesive layer attached polarizing film according to claim 1, wherein the onium of the onium-anion salt (B1) has no unsaturated bond.

7. The pressure-sensitive adhesive layer attached polarizing film according to claim 1, wherein the onium of the onium-anion salt (B1) is an alkyl onium having an alkyl group of 1 to 4 carbon atoms.

8. The pressure-sensitive adhesive layer attached polarizing film according to claim 1, which contains 0.1 to 10 parts by weight of the onium-anion salt (B1) based on 100 parts by weight of the (meth)acryl-based polymer (A).

9. The pressure-sensitive adhesive layer attached polarizing film according to claim 1, wherein the alkali metal of the alkali metal salt (B2) is lithium.

10. The pressure-sensitive adhesive layer attached polarizing film according to claim 1, wherein the polarizer has a thickness of 10 μm or less.

11. The pressure-sensitive adhesive layer attached polarizing film according to claim 1, wherein the (meth)acryl-based polymer (A) comprises an alkyl (meth)acrylate monomer unit and a hydroxyl group-containing monomer unit.

12. The pressure-sensitive adhesive layer attached polarizing film according to claim 1, wherein the (meth)acryl-based polymer (A) comprises an alkyl (meth)acrylate monomer unit and a carboxyl group-containing monomer unit.

13. The pressure-sensitive adhesive layer attached polarizing film according to claim 1, wherein the pressure-sensitive adhesive composition comprises the crosslinking agent (C).

14. The pressure-sensitive adhesive layer attached polarizing film according to claim 13, which contains 0.01 to 20 parts by weight of the crosslinking agent (C) based on 100 parts by weight of the (meth)acryl-based polymer (A).

15. The pressure-sensitive adhesive layer attached polarizing film according to claim 13, wherein the crosslinking agent (C) is at least one selected from an isocyanate compound and a peroxide.

16. The pressure-sensitive adhesive layer attached polarizing film according to claim 1, comprising 0.001 to 5 parts by weight of the silane coupling agent (D) based on 100 parts by weight of the (meth)acryl-based polymer (A).

17. The pressure-sensitive adhesive layer attached polarizing film according to claim 1, comprising 0.001 to 10 parts by weight of the polyether-modified silicone compound based on 100 parts by weight of the (meth)acryl-based polymer (A).

18. The pressure-sensitive adhesive layer attached polarizing film according to claim 1, wherein the (meth)acryl-based polymer (A) has a weight average molecular weight of 500,000 to 3,000,000.

19. An image display, comprising at least one piece of the pressure-sensitive adhesive layer attached polarizing film according to claim 1.

* * * * *